US012583210B2

(12) United States Patent
Tsai et al.

(10) Patent No.: US 12,583,210 B2
(45) Date of Patent: Mar. 24, 2026

(54) PROTECTIVE COVER PLATE AND MANUFACTURING METHOD THEREOF, AND DISPLAY DEVICE

(71) Applicant: BOE TECHNOLOGY GROUP CO., LTD., Beijing (CN)

(72) Inventors: Paoming Tsai, Beijing (CN); Xuekai Yang, Beijing (CN); Ce Xu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 254 days.

(21) Appl. No.: 18/258,227

(22) PCT Filed: May 18, 2022

(86) PCT No.: PCT/CN2022/093707
§ 371 (c)(1),
(2) Date: Jun. 19, 2023

(87) PCT Pub. No.: WO2023/221009
PCT Pub. Date: Nov. 23, 2023

(65) Prior Publication Data
US 2024/0375391 A1      Nov. 14, 2024

(51) Int. Cl.
*B32B 37/00*          (2006.01)
*B32B 17/10*          (2006.01)
(Continued)

(52) U.S. Cl.
CPC ............ *B32B 37/025* (2013.01); *B32B 17/10* (2013.01); *B32B 38/0004* (2013.01);
(Continued)

(58) Field of Classification Search
CPC ................ B32B 17/10; B32B 2250/02; B32B 2307/54; B32B 2307/584; B32B 2307/7376; B32B 2457/20; B32B 37/025; B32B 38/0004; B32B 33/00; G09F 9/30; G06F 1/1637
See application file for complete search history.

(56) References Cited

U.S. PATENT DOCUMENTS

2021/0141415 A1     5/2021   Gu et al.
2021/0261718 A1     8/2021   Takagi et al.
(Continued)

FOREIGN PATENT DOCUMENTS

CN          109896753 A        6/2019
CN          111469515 A        7/2020
(Continued)

OTHER PUBLICATIONS

Translation of WO 2023221009.*
Guan Peng et al., Study of Low-temperature Si/Si Bonding with Polymer Medium, Electronic Science and Technology, Sep. 15, 2014, pp. 175-177, vol. 27, Issue 9, Electronic Sci. & Tech., Chengdu, China Accessible at DOI:10.16180/j.cnki.issn1007-7820.2014.09.021.
(Continued)

*Primary Examiner* — Sonya M Sengupta
(74) *Attorney, Agent, or Firm* — XSENSUS LLP

(57)          ABSTRACT

A protective cover plate includes an ultra-thin glass layer and at least one thermoplastic protective film. The ultra-thin glass layer has two main surfaces opposite to each other. At least one main surface in the two main surfaces is coated with a thermoplastic protective film in the at least one thermoplastic protective film.

12 Claims, 16 Drawing Sheets

500

(51) Int. Cl.
B32B 38/00 (2006.01)
G06F 1/16 (2006.01)

(52) U.S. Cl.
CPC ........ G06F 1/1637 (2013.01); B32B 2250/02
(2013.01); B32B 2307/54 (2013.01); B32B
2307/584 (2013.01); B32B 2307/7376
(2023.05); B32B 2457/20 (2013.01)

(56) References Cited

U.S. PATENT DOCUMENTS

2022/0390988 A1 * 12/2022 Shi ........................ C09D 175/04
2024/0375391 A1 * 11/2024 Tsai ........................ B32B 33/00

FOREIGN PATENT DOCUMENTS

| | | |
|---|---|---|
| CN | 113059888 A | 7/2021 |
| WO | 2020140233 A1 | 7/2020 |
| WO | 2021003740 A1 | 1/2021 |
| WO | WO-2023221009 A1 * 11/2023 ............. B32B 17/10 | |

OTHER PUBLICATIONS

Zhang Yu et al., Development and Performance Test of the Adhesion for the Low Temperature Bonding Between Si and Polyimide, Micro-nano electronic technology, Dec. 28, 2012, vol. 49, Issue 10, China Electronics Technology Group Corporation Thirteenth Research Institute, Shijiazhuang City, China. Accessible at DOI: 10.3969/j.issn.1671-4776.2012.10.007.

* cited by examiner

100

100

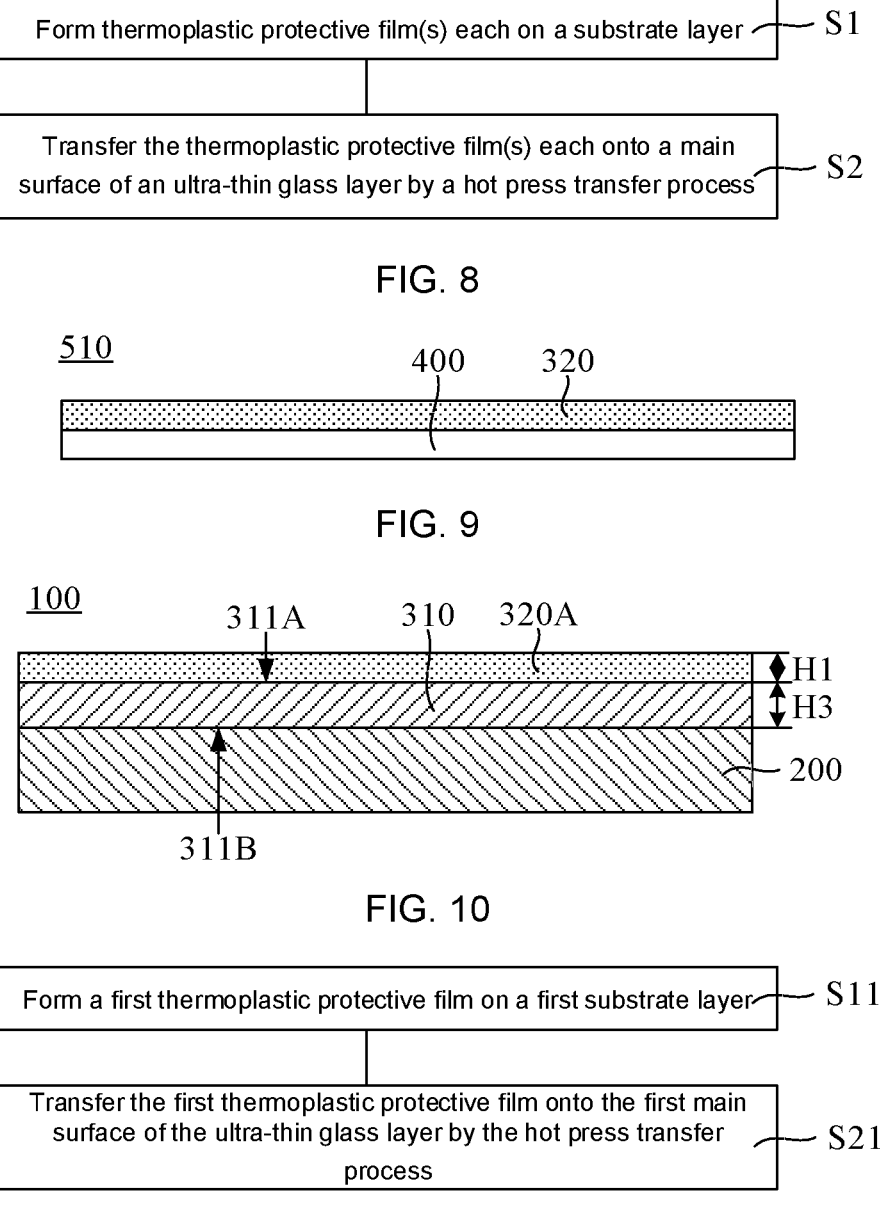

| | |
|---|---|
| Form thermoplastic protective film(s) each on a substrate layer | S1 |
| Transfer the thermoplastic protective film(s) each onto a main surface of an ultra-thin glass layer by a hot press transfer process | S2 |

| | |
|---|---|
| Form a first thermoplastic protective film on a first substrate layer | S11 |
| Transfer the first thermoplastic protective film onto the first main surface of the ultra-thin glass layer by the hot press transfer process | S21 |

FIG. 11

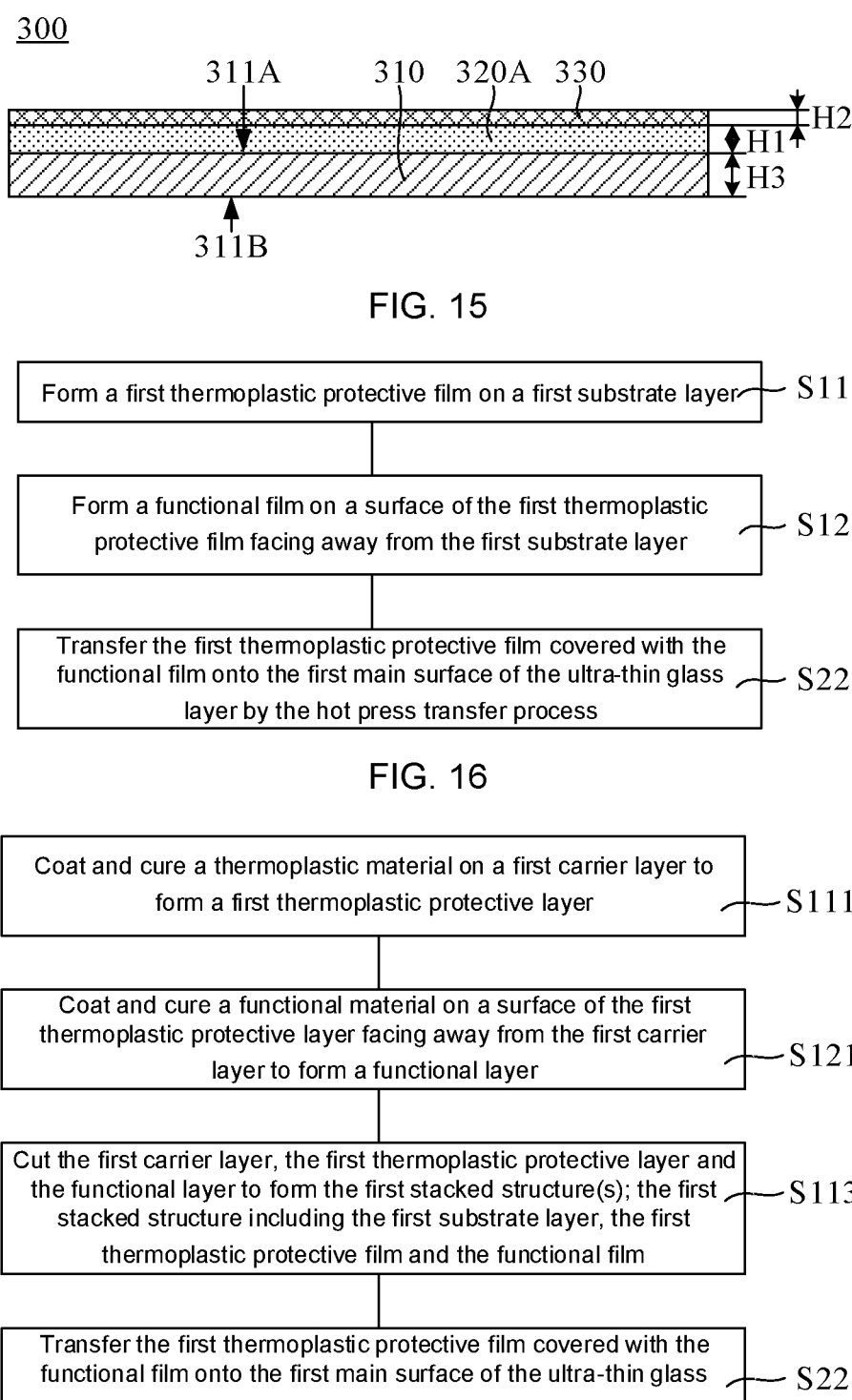

FIG. 15

| | |
|---|---|
| Form a first thermoplastic protective film on a first substrate layer | S11 |
| Form a functional film on a surface of the first thermoplastic protective film facing away from the first substrate layer | S12 |
| Transfer the first thermoplastic protective film covered with the functional film onto the first main surface of the ultra-thin glass layer by the hot press transfer process | S22 |

FIG. 16

| | |
|---|---|
| Coat and cure a thermoplastic material on a first carrier layer to form a first thermoplastic protective layer | S111 |
| Coat and cure a functional material on a surface of the first thermoplastic protective layer facing away from the first carrier layer to form a functional layer | S121 |
| Cut the first carrier layer, the first thermoplastic protective layer and the functional layer to form the first stacked structure(s); the first stacked structure including the first substrate layer, the first thermoplastic protective film and the functional film | S113 |
| Transfer the first thermoplastic protective film covered with the functional film onto the first main surface of the ultra-thin glass layer by the hot press transfer process | S22 |

FIG. 17

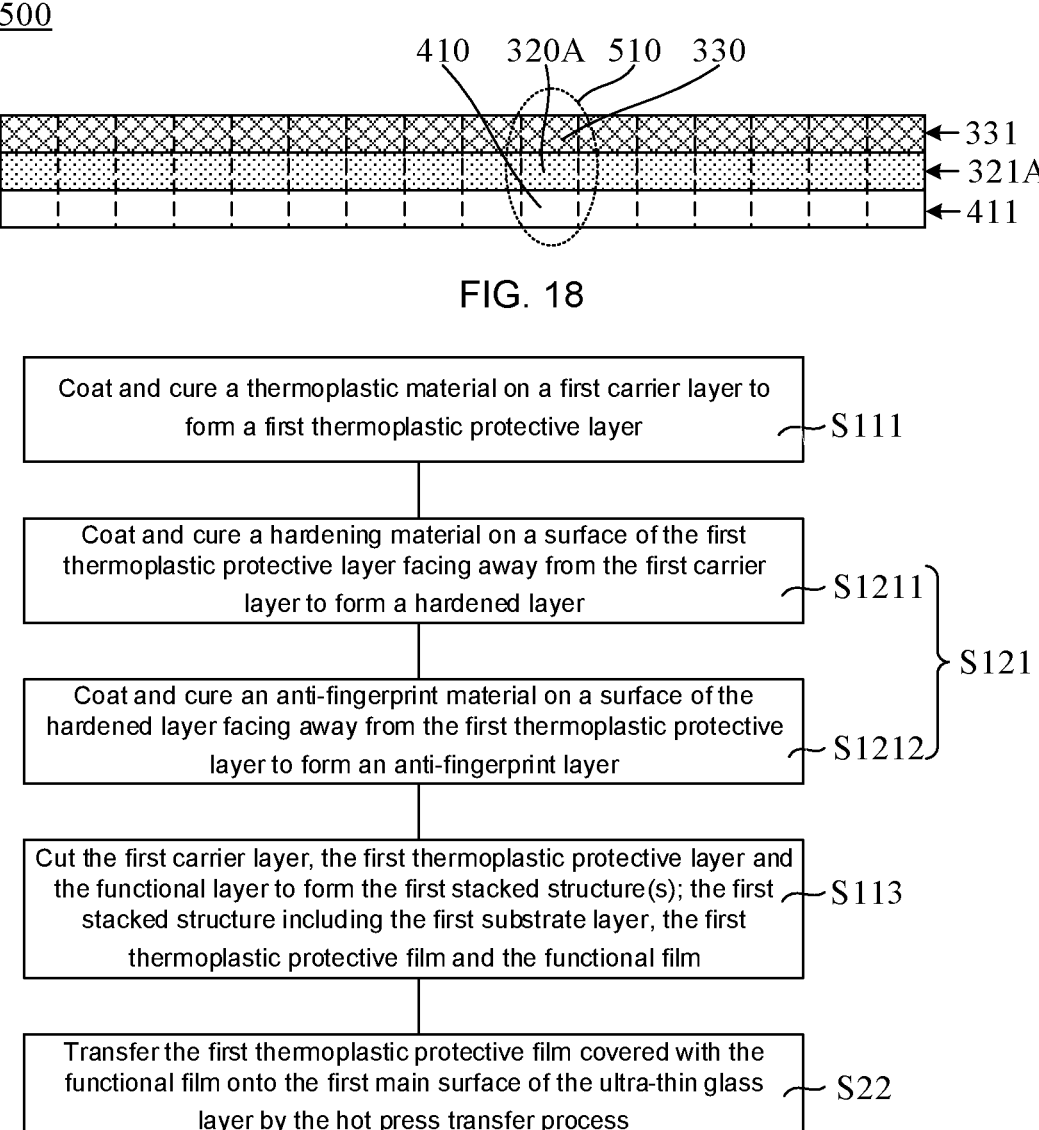

FIG. 18

| | |
|---|---|
| Coat and cure a thermoplastic material on a first carrier layer to form a first thermoplastic protective layer | S111 |
| Coat and cure a hardening material on a surface of the first thermoplastic protective layer facing away from the first carrier layer to form a hardened layer | S1211 |
| Coat and cure an anti-fingerprint material on a surface of the hardened layer facing away from the first thermoplastic protective layer to form an anti-fingerprint layer | S1212 |
| Cut the first carrier layer, the first thermoplastic protective layer and the functional layer to form the first stacked structure(s); the first stacked structure including the first substrate layer, the first thermoplastic protective film and the functional film | S113 |
| Transfer the first thermoplastic protective film covered with the functional film onto the first main surface of the ultra-thin glass layer by the hot press transfer process | S22 |

FIG. 19

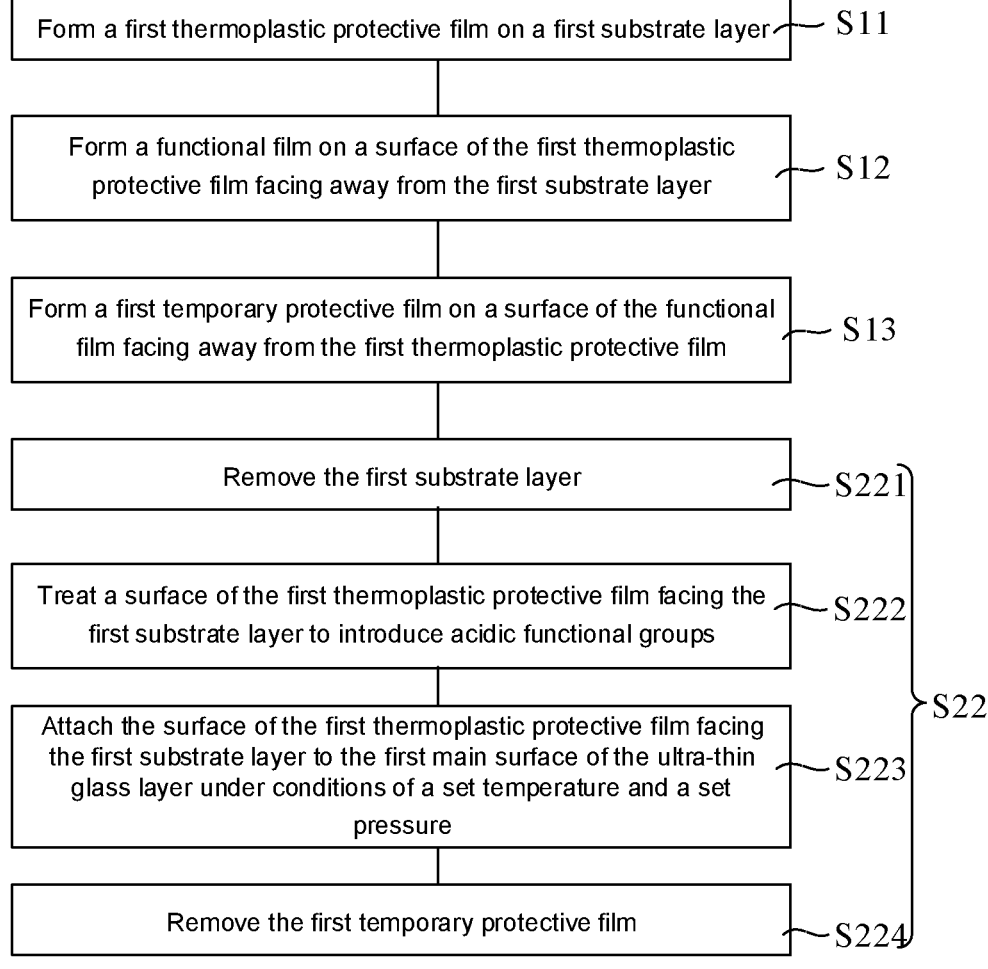

| Form a first thermoplastic protective film on a first substrate layer | S11 |

| Form a functional film on a surface of the first thermoplastic protective film facing away from the first substrate layer | S12 |

| Form a first temporary protective film on a surface of the functional film facing away from the first thermoplastic protective film | S13 |

| Remove the first substrate layer | S221 |

| Treat a surface of the first thermoplastic protective film facing the first substrate layer to introduce acidic functional groups | S222 |

| Attach the surface of the first thermoplastic protective film facing the first substrate layer to the first main surface of the ultra-thin glass layer under conditions of a set temperature and a set pressure | S223 |

| Remove the first temporary protective film | S224 |

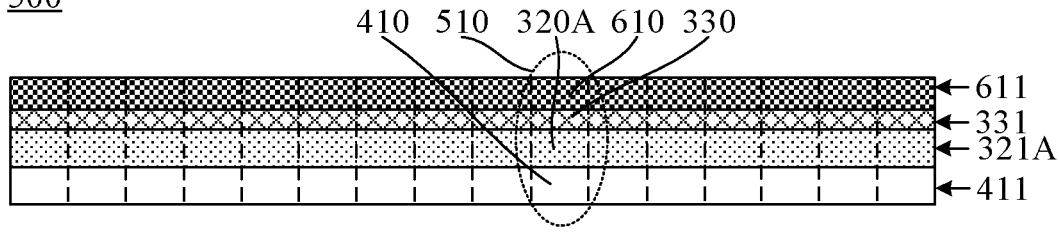

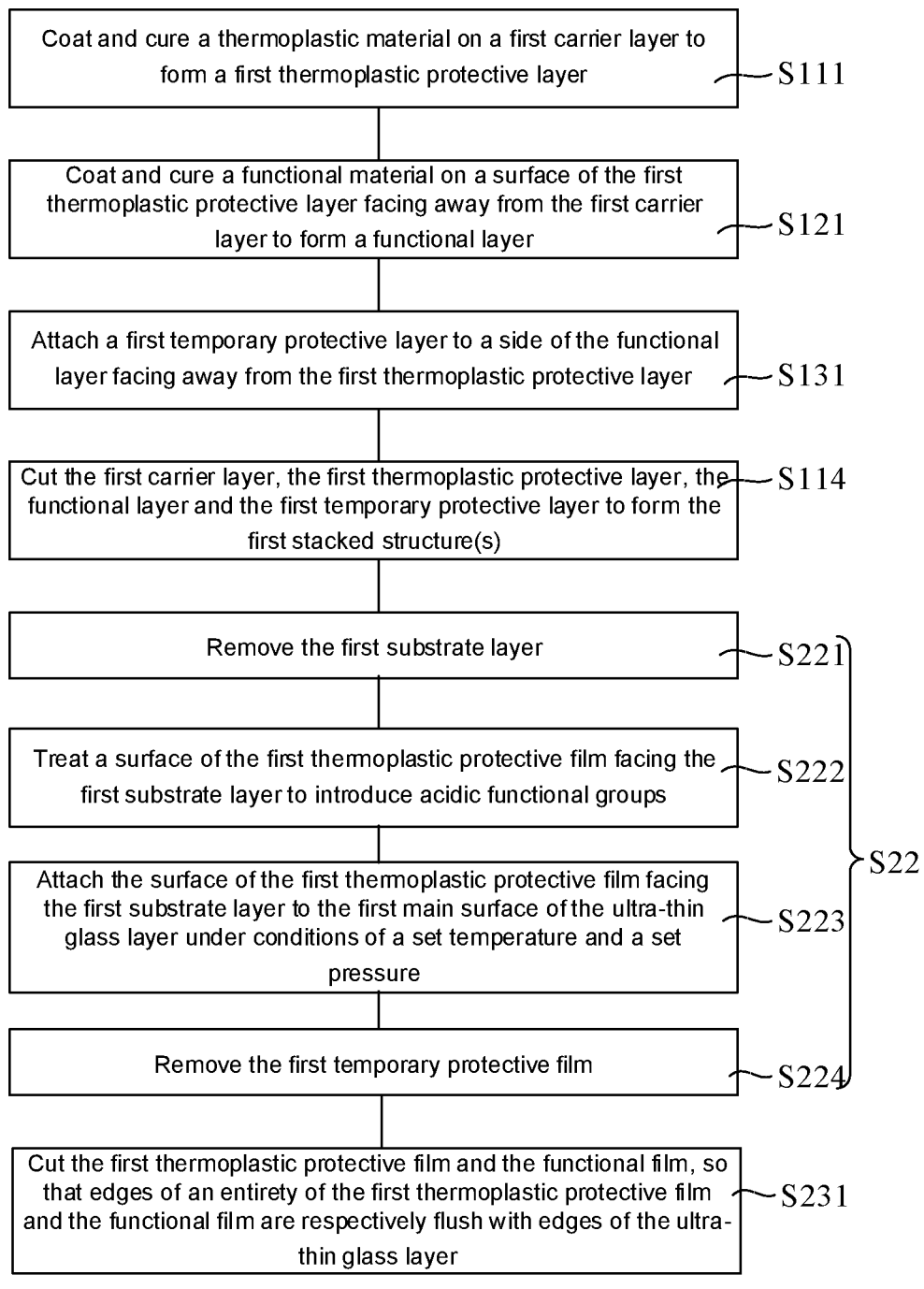

Coat and cure a thermoplastic material on a first carrier layer to form a first thermoplastic protective layer —S111

Coat and cure a functional material on a surface of the first thermoplastic protective layer facing away from the first carrier layer to form a functional layer —S121

Attach a first temporary protective layer to a side of the functional layer facing away from the first thermoplastic protective layer —S131

Cut the first carrier layer, the first thermoplastic protective layer, the functional layer and the first temporary protective layer to form the first stacked structure(s) —S114

Remove the first substrate layer —S221

Treat a surface of the first thermoplastic protective film facing the first substrate layer to introduce acidic functional groups —S222

Attach the surface of the first thermoplastic protective film facing the first substrate layer to the first main surface of the ultra-thin glass layer under conditions of a set temperature and a set pressure —S223

Remove the first temporary protective film —S224

S22

Cut the first thermoplastic protective film and the functional film, so that edges of an entirety of the first thermoplastic protective film and the functional film are respectively flush with edges of the ultra-thin glass layer —S231

FIG. 22A

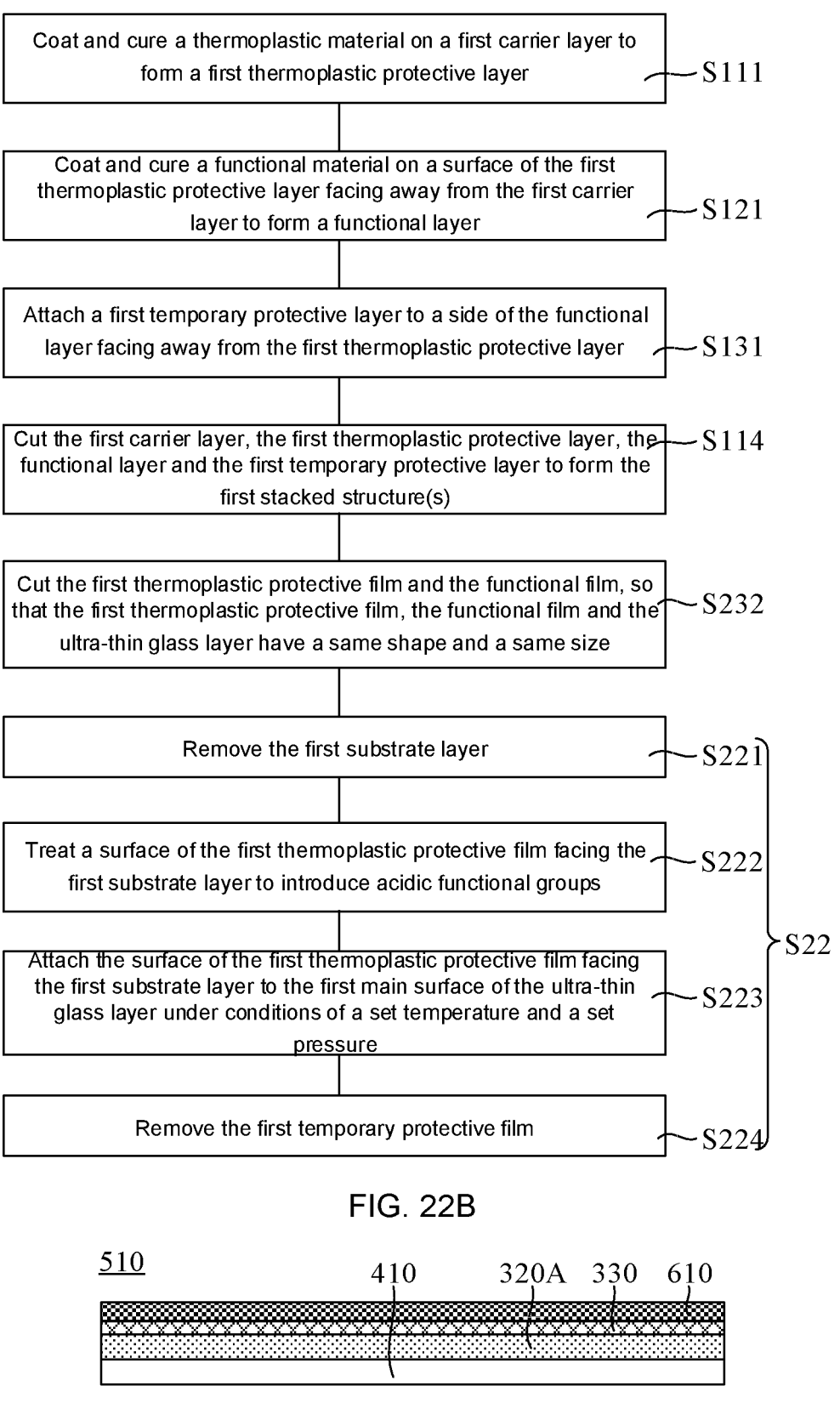

Coat and cure a thermoplastic material on a first carrier layer to form a first thermoplastic protective layer —S111

Coat and cure a functional material on a surface of the first thermoplastic protective layer facing away from the first carrier layer to form a functional layer —S121

Attach a first temporary protective layer to a side of the functional layer facing away from the first thermoplastic protective layer —S131

Cut the first carrier layer, the first thermoplastic protective layer, the functional layer and the first temporary protective layer to form the first stacked structure(s) —S114

Cut the first thermoplastic protective film and the functional film, so that the first thermoplastic protective film, the functional film and the ultra-thin glass layer have a same shape and a same size —S232

Remove the first substrate layer —S221

Treat a surface of the first thermoplastic protective film facing the first substrate layer to introduce acidic functional groups —S222

Attach the surface of the first thermoplastic protective film facing the first substrate layer to the first main surface of the ultra-thin glass layer under conditions of a set temperature and a set pressure —S223

Remove the first temporary protective film —S224

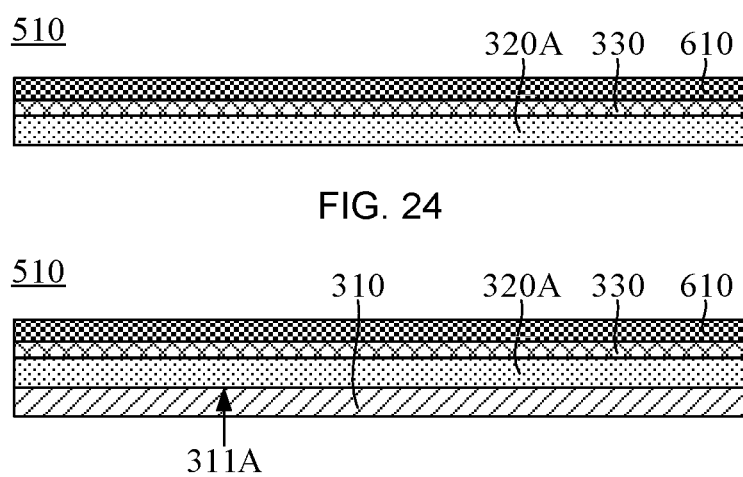
FIG. 24
FIG. 25
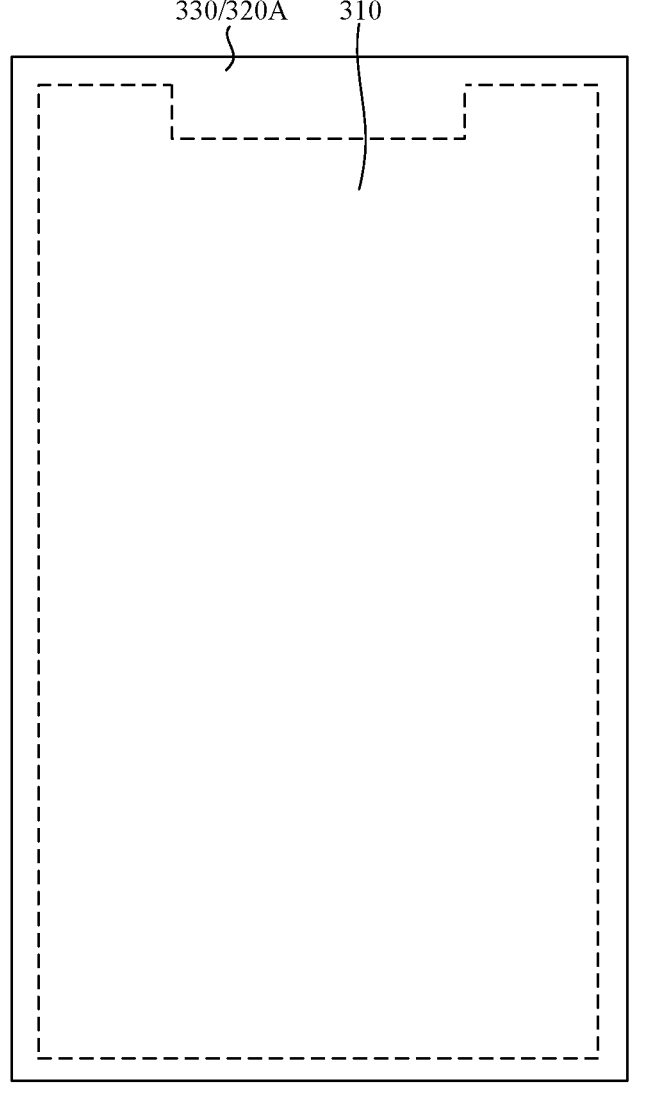
FIG. 26

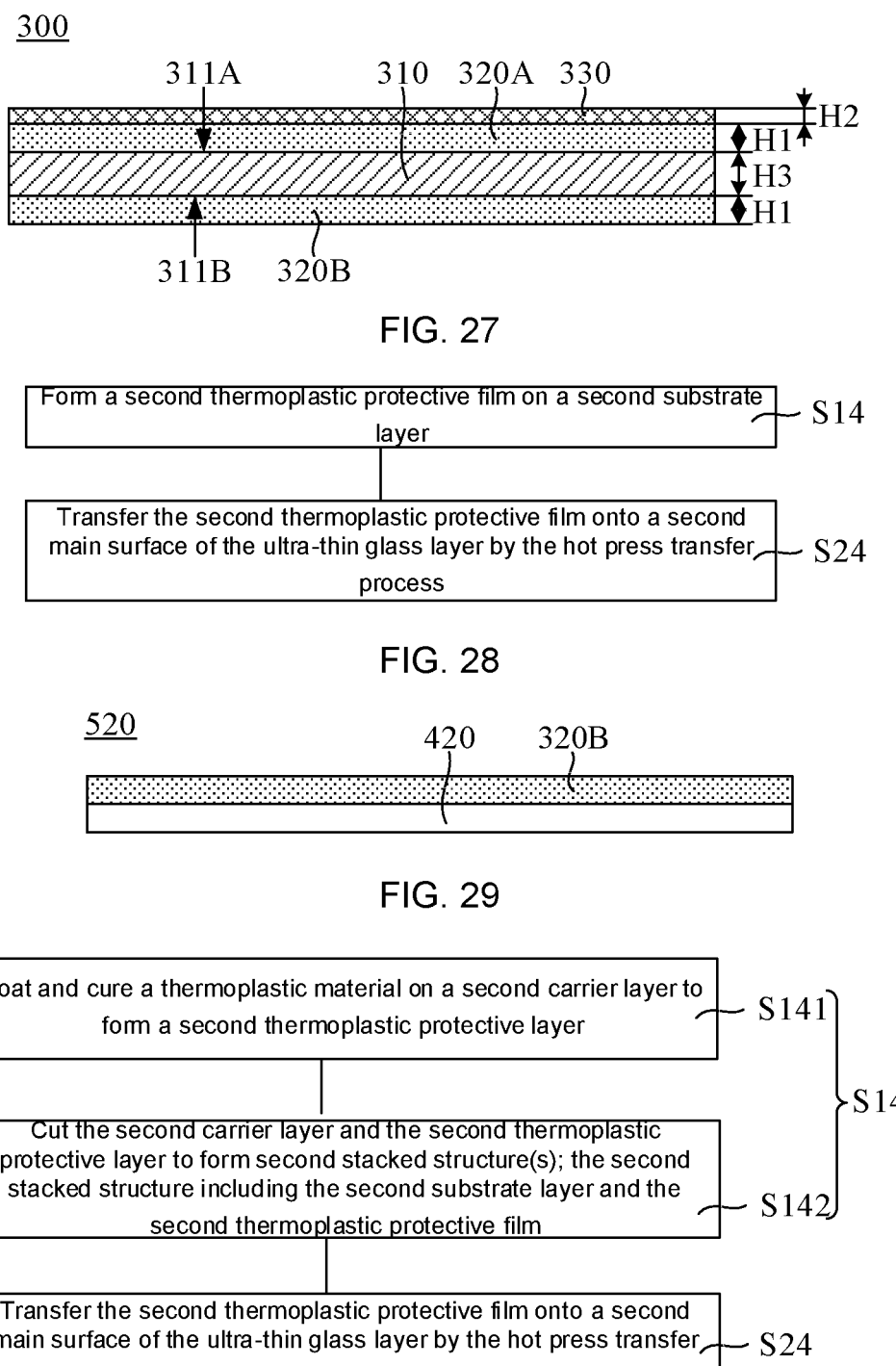

| Form a second thermoplastic protective film on a second substrate layer | — S14 |

| Transfer the second thermoplastic protective film onto a second main surface of the ultra-thin glass layer by the hot press transfer process | — S24 |

| Coat and cure a thermoplastic material on a second carrier layer to form a second thermoplastic protective layer | — S141 |

| Cut the second carrier layer and the second thermoplastic protective layer to form second stacked structure(s); the second stacked structure including the second substrate layer and the second thermoplastic protective film | — S142 |

S14

| Transfer the second thermoplastic protective film onto a second main surface of the ultra-thin glass layer by the hot press transfer process | — S24 |

FIG. 30

420   320B   520
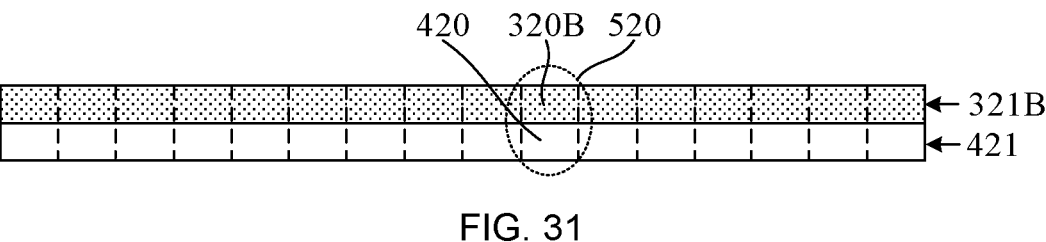
← 321B
← 421
FIG. 31
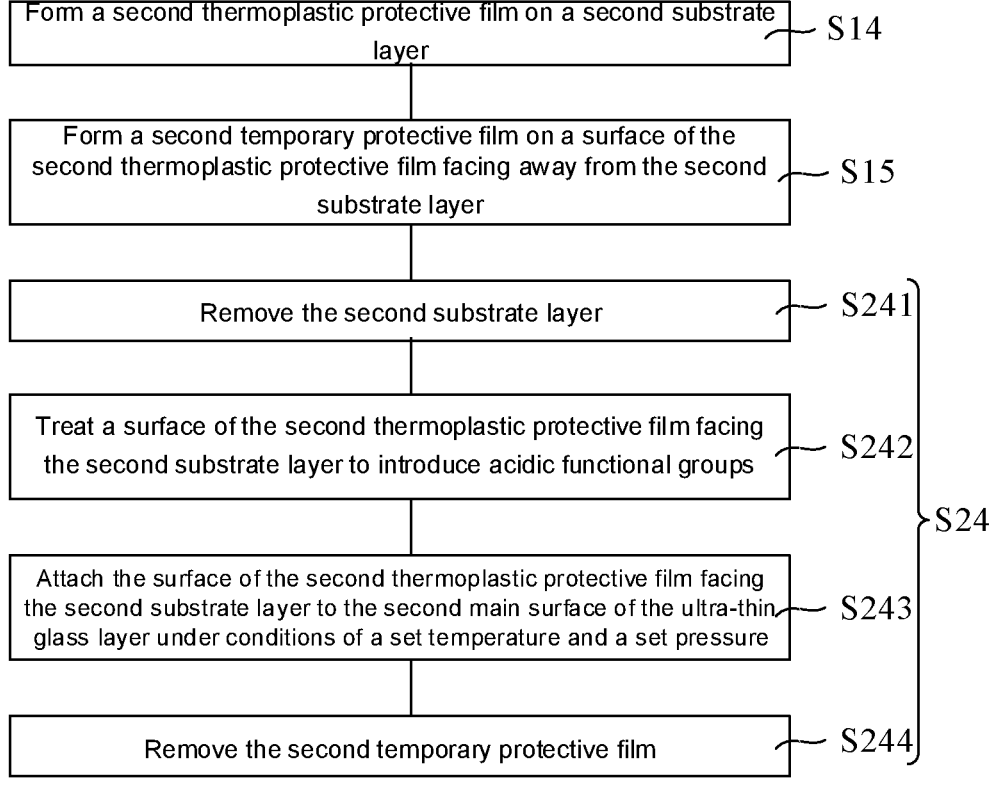
FIG. 32
520
420          320B          620
FIG. 33

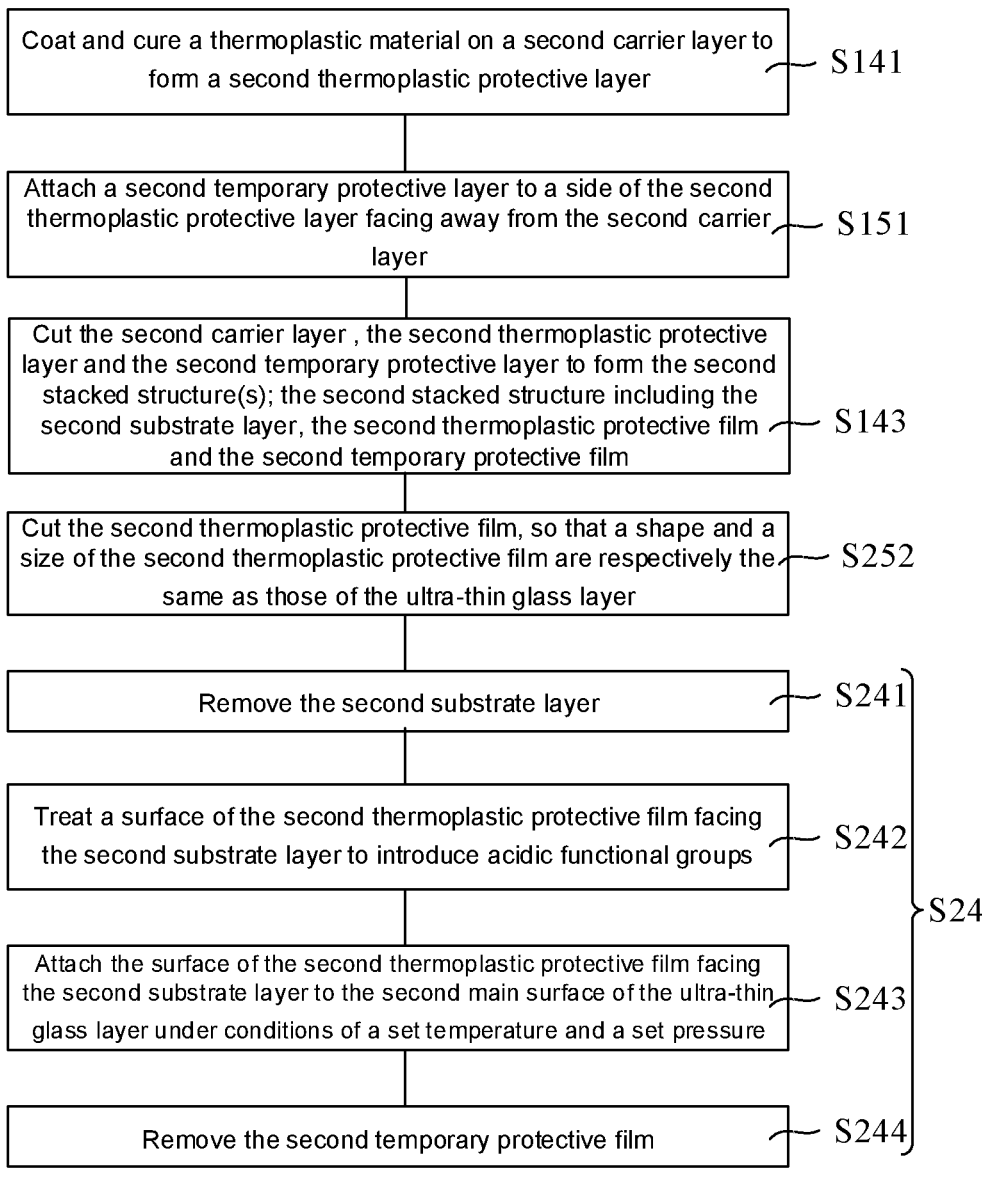

| | |
|---|---|
| Coat and cure a thermoplastic material on a second carrier layer to form a second thermoplastic protective layer | S141 |
| Attach a second temporary protective layer to a side of the second thermoplastic protective layer facing away from the second carrier layer | S151 |
| Cut the second carrier layer , the second thermoplastic protective layer and the second temporary protective layer to form the second stacked structure(s); the second stacked structure including the second substrate layer, the second thermoplastic protective film and the second temporary protective film | S143 |
| Cut the second thermoplastic protective film, so that a shape and a size of the second thermoplastic protective film are respectively the same as those of the ultra-thin glass layer | S252 |
| Remove the second substrate layer | S241 |
| Treat a surface of the second thermoplastic protective film facing the second substrate layer to introduce acidic functional groups | S242 |
| Attach the surface of the second thermoplastic protective film facing the second substrate layer to the second main surface of the ultra-thin glass layer under conditions of a set temperature and a set pressure | S243 |
| Remove the second temporary protective film | S244 |

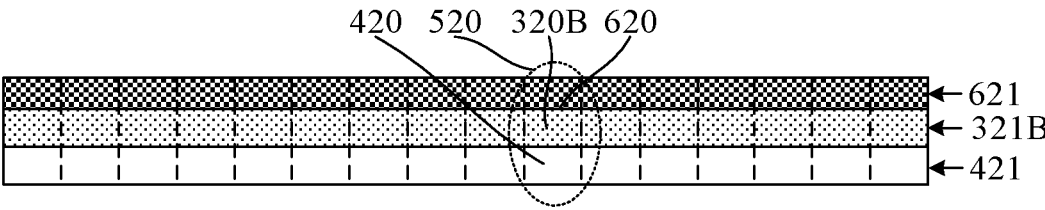

PROTECTIVE COVER PLATE AND MANUFACTURING METHOD THEREOF, AND DISPLAY DEVICE

CROSS-REFERENCE TO RELATED APPLICATION

This application is a national phase entry under 35 USC 371 of International Patent Application No. PCT/CN 2022/093707 filed on May 18, 2022, which is incorporated herein by reference in its entirety.

TECHNICAL FIELD

The present disclosure relates to the field of display technologies, and in particular, to a protective cover plate and a manufacturing method thereof, and a display device.

BACKGROUND

In recent years, many new designs of terminal displays have emerged, in which folding terminals shine brilliantly.

In the relater art, a polymer material is generally used as a first surface, but the continued development of the polymer material is limited by its poor optical properties, low hardness and severe creases. Ultra-thin glass (UTG), as an inorganic material, has advantages of high hardness, good optical properties, stable chemical properties and slight creases, and is a trend of future development.

SUMMARY

In an aspect, a protective cover plate is provided. The protective cover plate includes an ultra-thin glass layer and at least one thermoplastic protective film. The ultra-thin glass layer has two main surfaces opposite to each other. At least one main surface in the two main surfaces is coated with a thermoplastic protective film in the at least one thermoplastic protective film.

In some embodiments, a thickness of the at least one thermoplastic protective film is greater than or equal to 10 μm.

In some embodiments, at least a portion of a main surface in the at least one main surface is a plane including a plurality of sides, and a warpage degree of the plane is less than or equal to one-tenth of a longest side of the plane.

In some embodiments, a first main surface in the at least one main surface is coated with a first thermoplastic protective film in the at least one thermoplastic protective film. The protective cover plate further includes a functional film located on a surface of the first thermoplastic protective film facing away from the ultra-thin glass layer.

In some embodiments, the functional film includes a hardened film and/or an anti-fingerprint film.

In some embodiments, a thickness of the functional film is in a range of 0.1 μm to 20 μm, inclusive.

In some embodiments, a second main surface in the at least one main surface is coated with a second thermoplastic protective film in the at least one thermoplastic protective film.

In some embodiments, a thickness of the thermoplastic protective film is in a range of 10 μm to 500 μm, inclusive.

In some embodiments, a young's modulus of elasticity of the thermoplastic protective film is in a range of 5 Mpa to 10 Gpa, inclusive.

In some embodiments, a material of the thermoplastic protective film includes at least one of polyamide, polycarbonate, polymethyl methacrylate, polyurethane, polyethylene, polyester resin and transparent polyimide; the material of the thermoplastic protective film includes at least one of thermoplastic polyurethane, polyamide, polycarbonate, polymethyl methacrylate, polyethylene, polyester resin and transparent polyimide.

In some embodiments, a thickness of the ultra-thin glass layer is in a range of 10 μm to 100 μm, inclusive.

In another aspect, a display device is provided. The display device includes a display panel and the protective cover plate in any one of the above embodiments. The protective cover plate is located on a display side of the display panel.

In yet another aspect, a manufacturing method of a protective cover plate is provided. The manufacturing method of the protective cover plate includes: forming a thermoplastic protective film on a substrate layer; and transferring the thermoplastic protective film onto a main surface of an ultra-thin glass layer by a hot press transfer process.

In some embodiments, forming the thermoplastic protective film on the substrate layer, includes: forming a first thermoplastic protective film on a first substrate layer.

Transferring the thermoplastic protective film onto the main surface of the ultra-thin glass layer by the hot press transfer process, includes: transferring the first thermoplastic protective film onto a first main surface of the ultra-thin glass layer by the hot press transfer process.

In some embodiments, forming the first thermoplastic protective film on the first substrate layer, includes: coating and curing a thermoplastic material on a first carrier layer to form a first thermoplastic protective layer; and cutting the first carrier layer and the first thermoplastic protective layer to form a first stacked structure; the first stacked structure including the first substrate layer and the first thermoplastic protective film.

In some embodiments, after forming the first thermoplastic protective film on the first substrate layer, the manufacturing method further includes: forming a functional film on a surface of the first thermoplastic protective film facing away from the first substrate layer.

Transferring the first thermoplastic protective film onto the first main surface of the ultra-thin glass layer by the hot press transfer process, includes: transferring the first thermoplastic protective film covered with the functional film onto the first main surface of the ultra-thin glass layer by the hot press transfer process.

In some embodiments, forming the functional film on the surface of the first thermoplastic protective film facing away from the first substrate layer, includes: coating and curing a functional material on a surface of the first thermoplastic protective layer facing away from the first carrier layer to form a functional layer.

Cutting the first carrier layer and the first thermoplastic protective layer to form the first stacked structure, includes: cutting the first carrier layer, the first thermoplastic protective layer and the functional layer to form the first stacked structure. The first stacked structure includes the first substrate layer, the first thermoplastic protective film and the functional film.

In some embodiments, after forming the functional film on the surface of the first thermoplastic protective film facing away from the first substrate layer, the manufacturing method further includes: forming a first temporary protective film on a surface of the functional film facing away from the thermoplastic protective film.

Transferring the first thermoplastic protective film covered with the functional film onto the first main surface of the ultra-thin glass layer by the hot press transfer process, includes: removing the first substrate layer, attaching a surface of the first thermoplastic protective film facing the first substrate layer to the first main surface of the ultra-thin glass layer under conditions of a set temperature and a set pressure, and removing the first temporary protective film.

In some embodiments, after removing the first substrate layer and before attaching the surface of the first thermoplastic protective film facing the first substrate layer to the first main surface of the ultra-thin glass layer, transferring the first thermoplastic protective film covered with the functional film onto the first main surface of the ultra-thin glass layer by the hot press transfer process, further includes: treating the surface of the first thermoplastic protective film facing the first substrate layer to introduce acidic functional groups.

In some embodiments, after transferring the first thermoplastic protective film covered with the functional film onto the first main surface of the ultra-thin glass layer by the hot press transfer process, the manufacturing method further includes: cutting the first thermoplastic protective film and the functional film, so that edges of an entirety of the first thermoplastic protective film and the functional film are respectively flush with edges of the ultra-thin glass layer.

Alternatively, before transferring the first thermoplastic protective film covered with the functional film onto the first main surface of the ultra-thin glass layer by the hot press transfer process, the manufacturing method further includes: cutting the first thermoplastic protective film and the functional film, so that the first thermoplastic protective film, the functional film and the ultra-thin glass layer have a same shape and a same size.

In some embodiments, forming the thermoplastic protective film on the substrate layer, includes: forming a second thermoplastic protective film on a second substrate layer.

Transferring the thermoplastic protective film onto the main surface of the ultra-thin glass layer by the hot press transfer process, includes: transferring the second thermoplastic protective film onto a second main surface of the ultra-thin glass layer by the hot press transfer process.

In some embodiments, forming the second thermoplastic protective film on the second substrate layer, includes: coating and curing a thermoplastic material on a second carrier layer to form a second thermoplastic protective layer; and cutting the second carrier layer and the second thermoplastic protective layer to form a second stacked structure. The second stacked structure includes the second substrate layer and the second thermoplastic protective film.

In some embodiments, after forming the second thermoplastic protective film on the second substrate layer, the manufacturing method further includes: forming a second temporary protective film on a surface of the second thermoplastic protective film facing away from the second substrate layer.

Transferring the second thermoplastic protective film onto the second main surface of the ultra-thin glass layer by the hot press transfer process, includes: removing the second substrate layer; attaching a surface of the second thermoplastic protective film facing the second substrate layer to the second main surface of the ultra-thin glass layer under conditions of a set temperature and a set pressure; and removing the second temporary protective film.

In some embodiments, after removing the second substrate layer and before attaching the surface of the second thermoplastic protective film facing the second substrate layer to the second main surface of the ultra-thin glass layer, transferring the second thermoplastic protective film onto the second main surface of the ultra-thin glass layer by the hot press transfer process, further includes: treating the surface of the second thermoplastic protective film facing the second substrate layer to introduce acidic functional groups.

In some embodiments, after transferring the second thermoplastic protective film onto the second main surface of the ultra-thin glass layer by the hot press transfer process, the manufacturing method further includes: cutting the second thermoplastic protective film, so that edges of the second thermoplastic protective film are respectively flush with edges of the ultra-thin glass layer.

Alternatively, before transferring the second thermoplastic protective film onto the second main surface of the ultra-thin glass layer by the hot press transfer process, the manufacturing method further includes: cutting the second thermoplastic protective film, so that the second thermoplastic protective film and the ultra-thin glass layer have a same shape and a same size.

In some embodiments, the set temperature is in a range of 40° C. to 200° C., inclusive, and the set pressure is in a range of 1 Mpa to 20 Mpa, inclusive.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on an actual size of a product, an actual process of a method, and an actual timing of a signal involved in the embodiments of the present disclosure.

FIG. 8 is a flow diagram of a manufacturing method of a protective cover plate, in accordance with some embodiments;

FIG. 9 is a step diagram of a manufacturing method of a protective cover plate, in accordance with some embodiments;

FIG. 10 is a structural diagram of a display device, in accordance with some embodiments;

FIG. 11 is a flow diagram of a manufacturing method of a protective cover plate, in accordance with some embodiments;

FIG. 15 is a structural diagram of a protective cover plate, in accordance with some embodiments;

FIG. 16 is a flow diagram of a manufacturing method of a protective cover plate, in accordance with some embodiments;

FIG. 17 is a flow diagram of a manufacturing method of a protective cover plate, in accordance with some embodiments;

FIG. 18 is a step diagram of a manufacturing method of a protective cover plate, in accordance with some embodiments;

FIG. 19 is a flow diagram of a manufacturing method of a protective cover plate, in accordance with some embodiments;

FIG. 20 is a flow diagram of a manufacturing method of a protective cover plate, in accordance with some embodiments;

FIG. 21 a step diagram of a manufacturing method of a protective cover plate, in accordance with some embodiments;

FIG. 22A is a flow diagram of a manufacturing method of a protective cover plate, in accordance with some embodiments;

FIG. 22B is a flow diagram of a manufacturing method of a protective cover plate, in accordance with some embodiments;

FIG. 23 is a step diagram of a manufacturing method of a protective cover plate, in accordance with some embodiments;

FIG. 24 is a step diagram of a manufacturing method of a protective cover plate, in accordance with some embodiments;

FIG. 25 is a step diagram of a manufacturing method of a protective cover plate, in accordance with some embodiments;

FIG. 26 is a step diagram of a manufacturing method of a protective cover plate, in accordance with some embodiments;

FIG. 27 is a structural diagram of a protective cover plate, in accordance with some embodiments;

FIG. 28 is a flow diagram of a manufacturing method of a protective cover plate, in accordance with some embodiments;

FIG. 29 is a step diagram of a manufacturing method of a protective cover plate, in accordance with some embodiments;

FIG. 30 is a flow diagram of a manufacturing method of a protective cover plate, in accordance with some embodiments;

FIG. 31 is a step diagram of a manufacturing method of a protective cover plate, in accordance with some embodiments;

FIG. 32 is a flow diagram of a manufacturing method of a protective cover plate, in accordance with some embodiments;

FIG. 33 is a step diagram of a manufacturing method of a protective cover plate, in accordance with some embodiments;

FIG. 34B is a flow diagram of a manufacturing method of a protective cover plate, in accordance with some embodiments;

FIG. 35 is a step diagram of a manufacturing method of a protective cover plate, in accordance with some embodiments;

DETAILED DESCRIPTION

Figure 1:
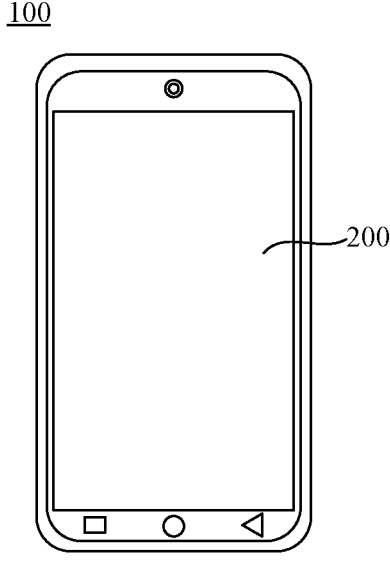
FIG. 1 is a structural diagram of a display device, in accordance with some embodiments.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to." In the description of the specification, the terms such as "some embodiments," "an example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are only used for descriptive purposes, and are not to be construed as indicating or implying relative importance or implicitly indicating the number of indicated technical features. Thus, a feature defined with "first" or "second" may explicitly or implicitly include one or more of the features. In the description of the embodiments of the present disclosure, the term "a plurality of/the plurality of" means two or more unless otherwise specified.

In the description of some embodiments, the terms such as "connected" and extensions thereof may be used. For example, the term "connected" may be used in the description of some embodiments to indicate that two or more components are in direct physical or electrical contact with each other. The embodiments disclosed herein are not necessarily limited to the contents herein.

The phrase "at least one of A, B and C" includes following combinations of A, B and C: only A, only B, only C, a combination of A and B, a combination of A and C, a combination of B and C, and a combination of A, B and C.

The phrase "A and/or B" includes following three combinations: only A, only B, and a combination of A and B.

As used herein, the term "if" is, optionally, construed to mean "when" or "in a case where" or "in response to determining" or "in response to detecting", depending on the context. Similarly, the phrase "if it is determined" or "if [a stated condition or event] is detected" is, optionally, construed to mean "in a case where it is determined" or "in response to determining" or "in a case where [the stated condition or event] is detected" or "in response to detecting [the stated condition or event]", depending on the context.

In addition, the use of the phase "based on" means openness and inclusiveness, since a process, step, calculation or other action that is "based on" one or more stated conditions or values may, in practice, be based on additional conditions or values exceeding those stated.

It will be understood that when a layer or element is described as being on another layer or substrate, the layer or element may be directly on the another layer or substrate, or intermediate layer(s) may exist between the layer or element and the another layer or substrate.

Exemplary embodiments are described herein with reference to sectional views and/or plan views as idealized exemplary drawings. In the accompanying drawings, thicknesses of layers and sizes of regions are enlarged for clarity. Thus, variations in shape relative to the accompanying drawings due to, for example, manufacturing techniques and/or tolerances may be envisaged. Therefore, the exemplary embodiments should not be construed to be limited to the shapes of regions shown herein, but to include deviations in shape due to, for example, manufacturing. For example, an etched region shown in a rectangular shape generally has a curved feature. Therefore, the regions shown in the accompanying drawings are schematic in nature, and their shapes are not intended to show actual shapes of the regions in a device, and are not intended to limit the scope of the exemplary embodiments.

Some embodiments of the present disclosure provide a display device 100. Referring to FIG. 1, the display device 100 in the embodiments of the present disclosure may be, for example, a tablet computer, a mobile phone, an electronic reader, a remote controller, a personal computer (PC), a notebook computer, a personal digital assistant (PDA), a vehicle-mounted device, a network television, a wearable device, or a television.

The display device 100 may be a liquid crystal display (LCD) device, or the display device 100 may be a self-luminescent display device, such as an electroluminescent display device or a photoluminescent display device. In a case where the display device is the electroluminescent display device, the electroluminescent display device may be an organic light-emitting diode (OLED) display device or a quantum dot light-emitting diode (QLED) display device. In a case where the display device is the photoluminescent display device, the photoluminescent display device may be a quantum dot photoluminescent display device. The type of the display device 100 is not limited in the present disclosure.

Figure 2:
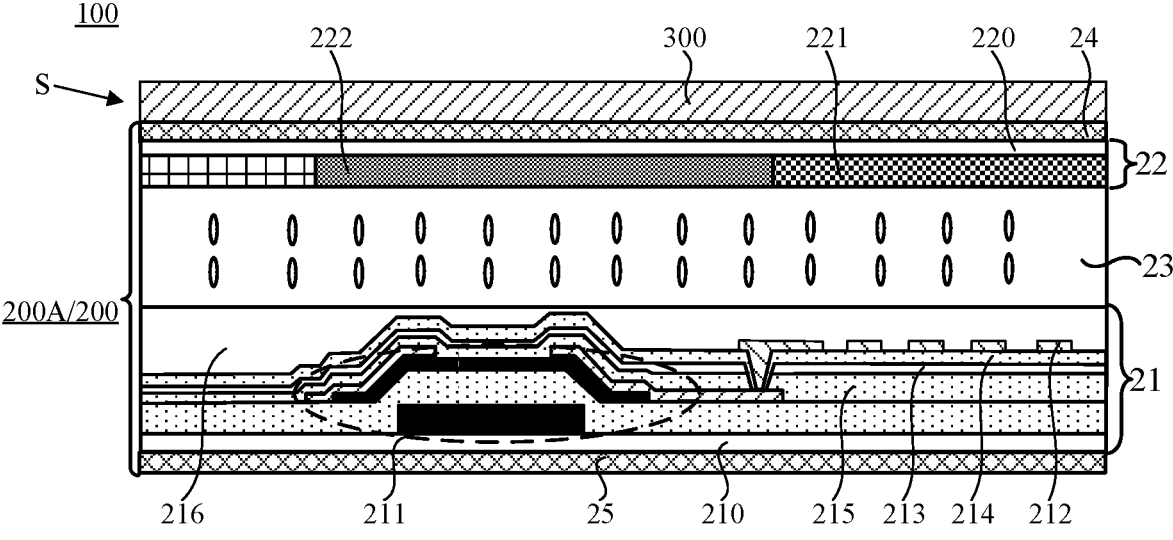
FIG. 2 is a structural diagram of a display device, in accordance with some embodiments.
Figure 3:
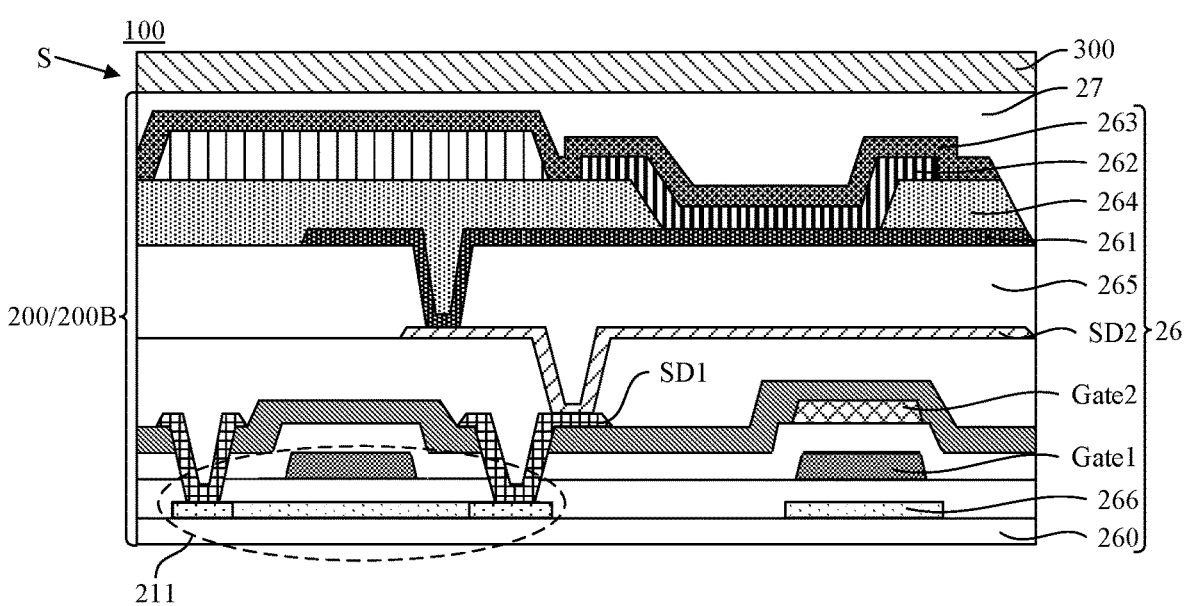
FIG. 3 is a structural diagram of a display device, in accordance with some embodiments.

Referring to FIGS. 2 and 3, the display device 100 includes a display panel 200 and a protective cover plate 300. The protective cover plate 300 is located on a display side S of the display panel 200.

Referring to FIG. 2, in a case where the display device 100 may be the liquid crystal display device, the display panel 200 is a liquid crystal display panel 200A. Main structures of the liquid crystal display panel 200A include an array substrate 21, an opposite substrate 22 and a liquid crystal layer 23 disposed between the array substrate 21 and the opposite substrate 22.

Each sub-pixel of the array substrate 21 includes a thin film transistor 211 and a pixel electrode 212 that are located on a first substrate 210. The thin film transistor 211 includes an active layer, a source, a drain, a gate and a gate insulating layer. The source and the drain are in contact with the active layer, and the pixel electrode 212 is electrically connected to the drain of the thin film transistor 211. In some embodiments, the array substrate 21 further includes a common electrode 213 disposed on the first substrate 210. The pixel electrode 212 and the common electrode 213 may be arranged in the same layer, and in this case, the pixel electrode 212 and the common electrode 213 each have a comb-tooth structure including a plurality of strip-shaped sub-electrodes. The pixel electrode 212 and the common electrode 213 may be arranged in different layers. In this case, as shown in FIG. 2, a first interlayer insulating layer 214 is disposed between the pixel electrode 212 and the common electrode 213. In a case where the common electrode 213 is disposed between the thin film transistor 211 and the pixel electrode 212, as shown in FIG. 2, a second interlayer insulating layer 215 is disposed between the common electrode 213 and the thin film transistor 211. In some other embodiments, the array substrate 21 does not include the common electrode 213, and in this case, the common electrode 213 may be located in the opposite substrate 22.

Referring to FIG. 2, the array substrate 21 further includes a planarization layer 216 disposed on a side of the thin film transistor 211 and the pixel electrode 212 away from the first substrate 210.

Referring to FIG. 2, the opposite substrate 22 includes a color filter layer 221 disposed on a second substrate 220. In this case, the opposite substrate 22 may also be referred to as a color filter (CF) substrate. The color filter layer 221 includes at least red photoresist units, green photoresist units and blue photoresist units. The red photoresist units, the green photoresist units and the blue photoresist units directly face sub-pixels in the array substrate 21 in one-to-one correspondence. The opposite substrate 22 further includes black matrix patterns 222 disposed on the second substrate 220, and the black matrix patterns 222 are used for separating the red photoresist units, the green photoresist units and the blue photoresist units.

Referring to FIG. 2, the liquid crystal display panel 200A further includes an upper polarizer 24 disposed on a side of the opposite substrate 22 away from the liquid crystal layer 23, and a lower polarizer 25 disposed on a side of the array substrate 21 away from the liquid crystal layer 23.

Referring to FIG. 2, in a case where the display panel 200 is the liquid crystal display panel 200A, the protective cover plate 300 is located on a side of the upper polarizer 24 facing away from the liquid crystal layer 23.

Referring to FIG. 3, in the case where the display device 100 is the electroluminescent display device, the display panel 200 is an electroluminescent display panel 200B. In this case, the display panel 200 may be a flexible display panel. The OLED display panel has advantages of lightness and thinness, flexibility, gorgeous color, high contrast and fast response speed, and is one of currently mainstream display panels.

Referring to FIG. 3, the electroluminescent display panel 200B may include a display substrate 26 and an encapsulation layer 27 for encapsulating the display substrate 26. Here, the encapsulation layer 27 may be an encapsulation film or an encapsulation substrate.

Referring to FIG. 3, the sub-pixel includes a driving circuit and a light-emitting device that are disposed on a third substrate 260. The driving circuit includes a plurality of thin film transistors. The light-emitting device includes an anode 261, a light-emitting functional layer 262 and a cathode 263, and the anode 261 is electrically connected to a drain of a thin film transistor 211 in the plurality of thin film transistors 211 serving as a driving transistor. The electroluminescent display panel 200B further includes a pixel defining layer 264, and the pixel defining layer 264 includes a plurality of opening regions. The light-emitting functional layer 262 is disposed in an opening region. In some embodiments, the light-emitting functional layer 262 includes a light-emitting layer. In some other embodiments, in addition to the light-emitting layer, the light-emitting functional layer 262 further includes one or more of an electron transport layer (ETL), an electron injection layer (EIL), a hole transport layer (HTL) and a hole injection layer (HIL).

Referring to FIG. 3, the electroluminescent display panel 200B further includes a planarization layer 265 disposed between the driving circuit and the anode 261.

In some embodiments, referring to FIG. 3, the electroluminescent display panel 200B includes an active film layer 266, a first gate metal layer Gate1, a second gate metal layer Gate2, a first source-drain metal layer SD1 and a second source-drain metal layer SD2 that are sequentially disposed on the third substrate 260. The active film layer 266 and the first gate metal layer Gate1 are used for forming at least a part of the thin film transistors 211 in the driving circuit. In a case where the active film layer 266 and the first gate metal layer Gate1 are used for forming the part of the thin film transistors 211 in the driving circuit, the active film layer 266 and the second gate metal layer Gate2 may be used for forming the remaining part of the thin film transistors 211 in the driving circuit, and the first gate metal layer Gate1 and the second gate metal layer Gate2 are used for forming capacitor(s) in the driving circuit. The first source-drain metal layer SD1 and the second source-drain metal layer SD2 include a plurality of signal lines for transmitting signals to driving circuits, such as data lines, initialization signal lines and power signal lines, which are not listed here.

In the case the display device 100 is the electroluminescent display device, the protective cover plate 300 is located on a side of the encapsulation layer 27 facing away from the third substrate 260.

Figure 4:
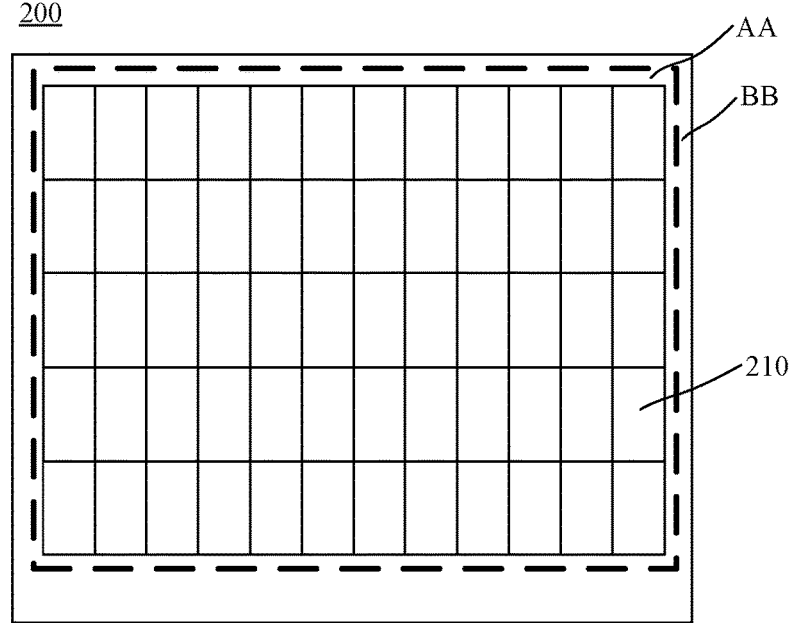
FIG. 4 is a structural diagram of a display panel, in accordance with some embodiments.

Referring to FIG. 4, the display panel 200 has a display area AA and a peripheral area BB located on at least one side of the display area AA. In some examples, the peripheral area BB is arranged around the display area AA. A plurality of sub-pixels 210 are disposed in the display area AA, and are arranged in the display area AA according to a specified rule. The sub-pixel 210 is a minimum unit for displaying an image in the display panel 200, and each sub-pixel 210 may display a single color, such as red, green, or blue. By adjusting brightnesses of the sub-pixels 210 with different colors, display of a plurality of colors may be realized through color combination and superposition.

The display panel 200 is described above, and the protective cover plate 300 will be described below.

Some embodiments of the present disclosure provide the protective cover plate 300. Referring to FIGS. 2 and 3, the protective cover plate 300 may be located on the display side of the display panel 200.

Figure 5:
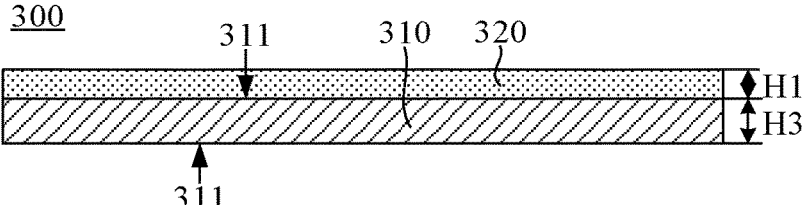
FIG. 5 is a structural diagram of a protective cover plate, in accordance with some embodiments.
Figure 6:
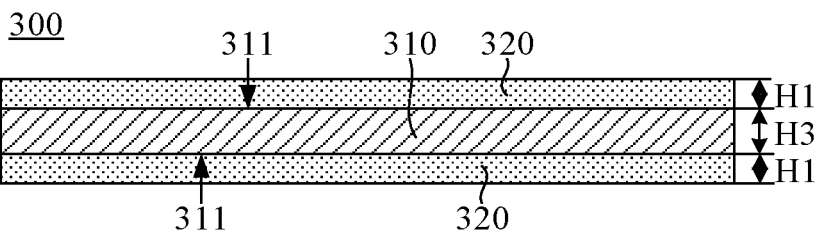
FIG. 6 is a structural diagram of a protective cover plate, in accordance with some embodiments.

Referring to FIGS. 5 and 6, the protective cover plate 300 includes an ultra-thin glass layer 310 and at least one thermoplastic protective film 320. The ultra-thin glass layer 310 has two main surfaces 311 opposite to each other, and at least one main surface 311 is coated with a thermoplastic protective film 320.

In some examples, referring to FIG. 5, a main surface 311 of the ultra-thin glass layer 310 is provided with a thermoplastic protective film 320 thereon. In some other embodiments, referring to FIG. 6, the two main surfaces 311 of the ultra-thin glass layer 310 are each provided with a thermoplastic protective film 320 thereon. The thermoplastic protective film 320 has thermoplasticity, and the thermoplastic protective film 320 has adhesiveness under heating.

In the protective cover plate 300 provided in some embodiments of the present disclosure, the at least one main surface 311 of the ultra-thin glass layer 310 is provided with the thermoplastic protective film 320, so that the main surface of the ultra-thin glass layer 310 may have a good impact resistance effect, so as to improve an impact resistance of the protective cover plate 300.

A manufacturing method of the protective cover plate will be exemplarily described below.

Some embodiments of the present disclosure provide the manufacturing method of the protective cover plate. Referring to FIG. 8, the manufacturing method of the protective cover plate includes following S1 and S2.

In S1, the thermoplastic protective film(s) 320 each are formed on a substrate layer 400, referring to FIG. 9.

For example, in S1, the thermoplastic protective film 320 may be formed through a coating process. The thermoplastic protective film 320 is formed before the thermoplastic protective film 320 is transferred onto the ultra-thin glass layer 310.

In S2, the thermoplastic protective film(s) 320 each are transferred onto the main surface 311 of the ultra-thin glass layer 310 by a hot press transfer process.

The thermoplastic protective film 320 has the thermoplasticity, and thus, in S2, the thermoplastic protective film 320 has the adhesiveness under a hot press condition. Therefore, the thermoplastic protective film 320 may be adhered to the ultra-thin glass layer 310 when the thermoplastic protective film 320 is transferred onto the main surface 311 of the ultra-thin glass layer 310.

In an implementation, a protective cover plate includes the ultra-thin glass layer 310 and a thermosetting protective film located on a side of the ultra-thin glass layer 310. The thermosetting protective film includes a thermosetting material. In this case, in a process of manufacturing the protective cover plate, the thermosetting material needs to be coated on the ultra-thin glass layer 310, and then dried to form a film. However, in a process of drying the thermosetting material to form the film, a shrinkage force is applied to the ultra-thin glass layer 310, which easily results in a warpage of the ultra-thin glass layer 310. In order to avoid the warpage of the ultra-thin glass layer 310, a coating thickness of the thermosetting material is reduced, which results in a reduction in the thickness of the thermosetting protective film. However, the lower the thickness of the thermosetting protective film, the poorer the impact resistance of the protective cover plate, and the more easily the ultra-thin glass layer 310 is broken.

Figure 7:
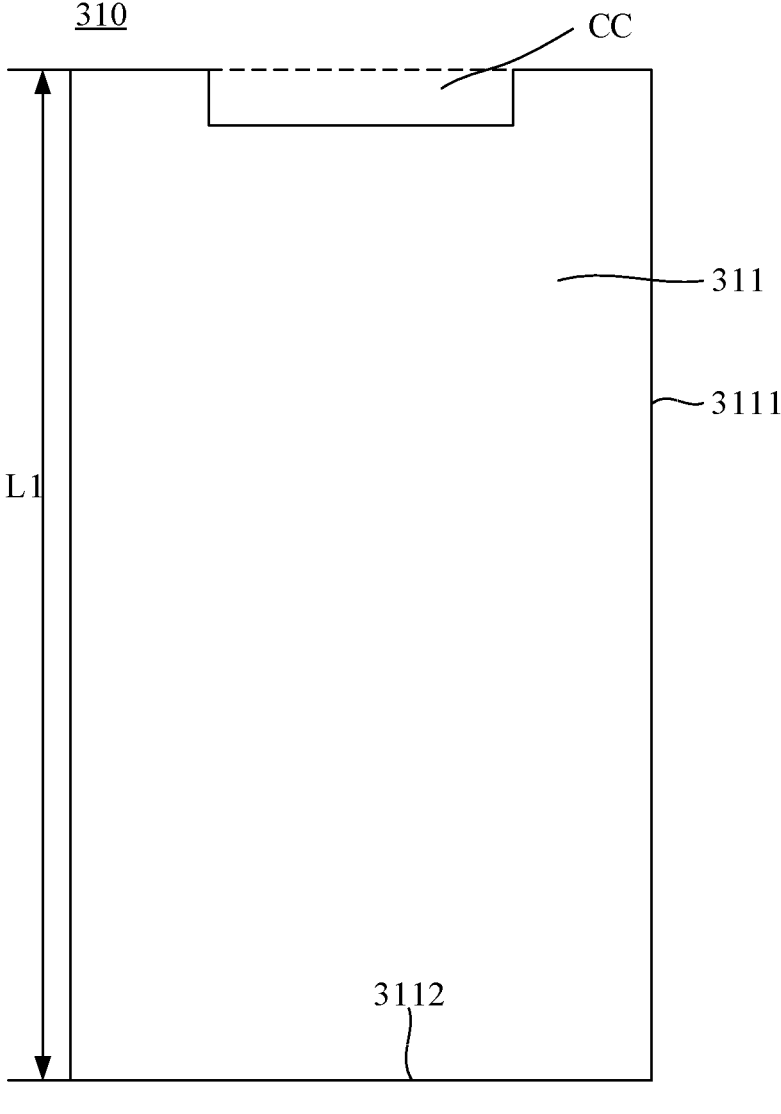
FIG. 7 is a structural diagram of an ultra-thin glass layer, in accordance with some embodiments.

In addition, the protective cover plate is mostly shaped, and thus the ultra-thin glass layer 310 is mostly shaped, as shown in FIG. 7. When the thermosetting material is applied to a CC region, since the ultra-thin glass layer 310 is not located in the CC region, the thermosetting material is sprayed on a base platform in this case, which results in contamination of the base platform.

However, in the manufacturing method of the protective cover plate 300 provided in some embodiments of the present disclosure, the thermoplastic protective film 320 has the thermoplasticity, and the thermoplastic protective film 320 is formed on the surface of the ultra-thin glass layer 310 by the hot press transfer process.

The thermoplastic protective film 320 is already formed before being transferred, so that a thermoplastic material does not need to be coated on the surface of the ultra-thin glass layer 310. Moreover, after the thermoplastic protective film 320 is transferred onto the ultra-thin glass layer 310, the warpage of the ultra-thin glass layer 310 is not easily generated.

In addition, since the thermoplastic protective film 320 is formed on the main surface 311 of the ultra-thin glass layer 310 by the hot press transfer process, the warpage of the ultra-thin glass layer 310 is not easily generated. Therefore, the thermoplastic protective film 320 may have a large thickness, and the greater the thickness of the thermoplastic protective film 320, the better the impact resistance, so that the protective cover plate 300 may have a better impact resistance.

In some embodiments, the thickness of each of the at least one thermoplastic protective film 320 is greater than or equal to 10 μm. Referring to FIGS. 5 and 6, the thickness of the thermoplastic protective film 320 is H1, and H1 is greater than or equal to 10 μm (H1≥10 μm), so that the protective cover plate 300 may be ensured to have a good impact resistance.

In some embodiments, at least a portion of the main surface 311 is a plane including a plurality of sides, and a warpage degree of the plane is less than or equal to one-tenth of a longest side of the plane.

In some examples, the portion of the main surface 311 is the plane, and the remaining portion of the main surface 311 may be a curved surface.

In some other examples, referring to FIG. 7, the entire main surface 311 is the plane. In this case, the main surface 311 includes the plurality of sides including a first side 3111 and a second side 3112, and a length of the first side 3111 is greater than a length of the second side 3112. The length of the first side 3111 is L1. The warpage degree of the plane is less than or equal to 0.1 L1. That is, a maximum warpage height of the plane is less than or equal to 0.1 L1.

Therefore, in the protection cover plate 300 provided in some embodiments of the present disclosure, in a case where the thickness of the thermoplastic protective film 320 is large, the protection cover plate 300 may still have a warpage degree of 0, or may have a small warpage degree. Therefore, when the protective cover plate 300 is disposed on the display panel 200, the protective cover plate 300 may be better attached to the display panel 200, so as to improve the display effect of the display panel 200.

In some embodiments, referring to FIG. 10, a first main surface 311A is coated with a first thermoplastic protective film 320A.

The first main surface 311A of the ultra-thin glass layer 310 is coated with the first thermoplastic protective film 320A, so that the first main surface 311A of the ultra-thin glass layer 310 may be protected.

When the protective cover plate 300 is disposed on the display panel 200, a second main surface 311B of the ultra-thin glass layer 310 may face the display panel 200, and the first main surface 311A faces away from the display panel 200. In this case, the first main surface 311A of the ultra-thin glass layer 310 is vulnerable to impact. Therefore, the first main surface 311A of the ultra-thin glass layer 310 is coated with the first thermoplastic protective film 320A, so that the protective cover plate 300 may have a good impact resistance.

Based on this, in some embodiments, referring to FIG. 11, in S1, forming the thermoplastic protective film(s) 320 each on the substrate layer 400, includes: S11, i.e., forming the first thermoplastic protective film 320A on a first substrate layer 410. In S11, the first thermoplastic protective film 320A may be formed on the first substrate layer 410 by a coating process.

Referring to FIG. 11, in S2, transferring the thermoplastic protective film(s) 320 each onto the main surface 311 of the ultra-thin glass layer 310 by the hot press transfer process includes: S21, i.e., transferring the first thermoplastic protective film 320A onto the first main surface 311A of the ultra-thin glass layer 310 by the hot press transfer process.

Before the first thermoplastic protective film 320A is transferred onto the first main surface 311A of the ultra-thin glass layer 310, the first substrate layer 410 may be removed, so that a surface of the first thermoplastic protective film 320A facing the first substrate layer 410 is attached to the first main surface 311A. In addition, a surface of the first thermoplastic protective film 320A facing away from the first substrate layer 410 may be attached to the first main surface 311A, and the first substrate layer 410 is removed after transfer.

Figure 12:
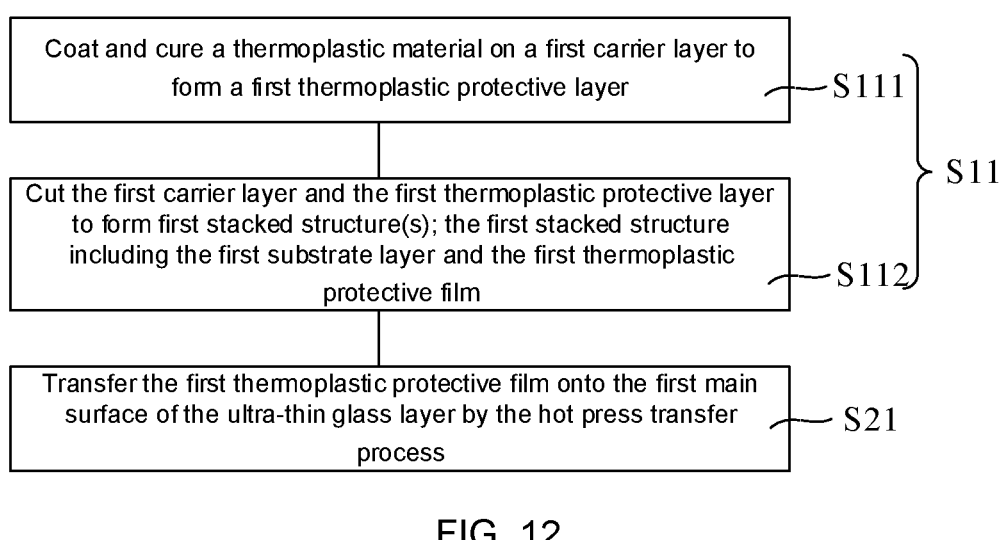
FIG. 12 is a flow diagram of a manufacturing method of a protective cover plate, in accordance with some embodiments.

In some embodiments, referring to FIG. 12, in S11, forming the first protective thermoplastic film 320A on the first substrate layer 410 includes following S111 and S112.

In S111, a thermoplastic material is coated on a first carrier layer 411, and is cured to form a first thermoplastic protective layer 321A.

Figure 13:
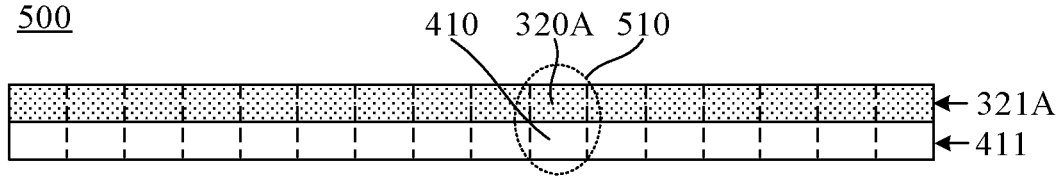
FIG. 13 is a step diagram of a manufacturing method of a protective cover plate, in accordance with some embodiments.

Referring to FIG. 13, the first carrier layer 411 has a large area, and the first carrier layer 411 may include a plurality of first substrate layers 410.

In S111, a solution including the thermoplastic material may be coated on the first carrier layer 411, and then dried to evaporate a solvent in the solution, so that the thermoplastic material is cured to form the first thermoplastic protective layer 321A.

In some examples, the first thermoplastic protective layer 321A may be manufactured in a roll-to-roll manner.

Figure 14:
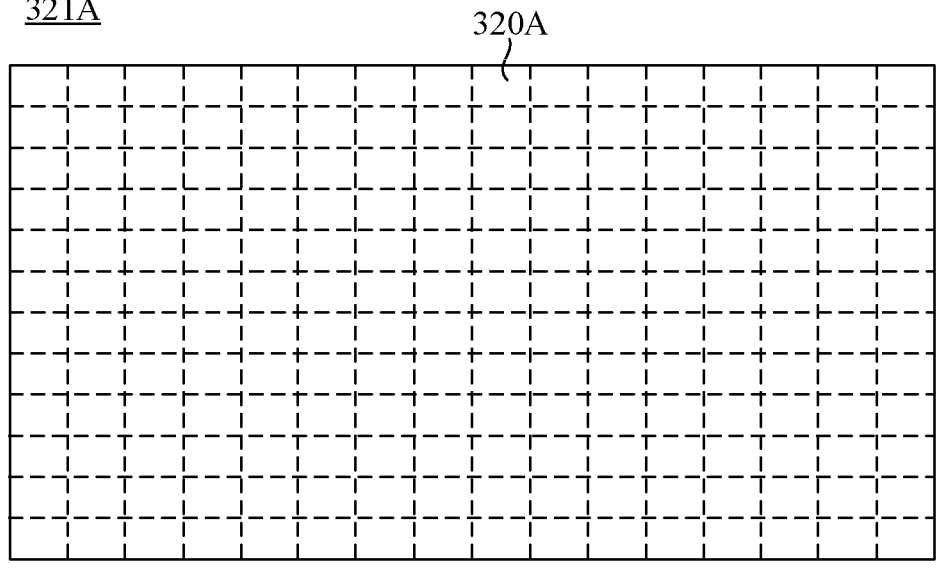
FIG. 14 is a step diagram of a manufacturing method of a protective cover plate, in accordance with some embodiments.

Referring to FIGS. 13 and 14, the first thermoplastic protective layer 321A may include a plurality of first thermoplastic protective films 320A. Therefore, in some embodiments of the present disclosure, the plurality of first thermoplastic protective films 320A may be formed through one coating process, without separately manufacturing a first thermoplastic protective film 320A for each ultra-thin glass layer 310. Therefore, the number of coating processes may be reduced, thereby reducing costs.

In addition, the first carrier layer 411 may be set to be rectangular, and when the first carrier layer 411 is coated with the thermoplastic material, the base platform is not contaminated.

For the convenience of description, referring to FIG. 13, the first thermoplastic protective layer 321A and the first carrier layer 411 may be defined as an initial stacked structure 500.

In S112, the first carrier layer 411 and the first thermoplastic protective layer 321A are cut to form first stacked structure(s) 510. The first stacked structure 510 includes the first substrate layer 410 and the first thermoplastic protective film 320A.

Referring to FIG. 13, the initial stacked structure 500 may be divided into a plurality of first stacked structures 510.

In some embodiments, referring to FIG. 15, the protective cover plate 300 further includes a functional film 330. The functional film 330 is located on a surface of the first thermoplastic protective film 320A facing away from the ultra-thin glass layer 310.

The protective cover plate 300 may have other functions by disposing the functional film 330 on the first thermoplastic protective film 320A.

In some embodiments, referring to FIG. 15, a thickness H2 of the functional film 330 is in a range of 0.1 μm to 20 μm, inclusive.

The greater the thickness of the functional film 330, the less easily the functional film 330 is bent. In some examples of the present disclosure, H2 is greater than or equal to 0.1 μm and is less than or equal to 20 μm (i.e., 0.1 μm≤H2≤20 μm), so that the protective cover plate 300 may be prevented from being difficultly bent due to an excessive thickness H2 (e.g., greater than 20 μm) of the functional film 330. In addition, the functional film may be prevented from not having its desired function(s) due to a too small thickness H2 (e.g., less than 0.1 μm) of the functional film 330.

In some examples, the thickness H2 of the functional film 330 is in a range of 3 μm to 20 μm, inclusive.

Based on this, in some embodiments, referring to FIG. 16, after the first thermoplastic protective film 320A is formed on the first substrate layer 410 in S11, S12 is included, i.e., the functional film 330 is formed on the surface of the first thermoplastic protective film 320A facing away from the first substrate layer 410.

Referring to FIG. 16, transferring the first thermoplastic protective film 320A onto the first main surface 311A of the ultra-thin glass layer 310 by the hot press transfer process in S21, includes: S22, i.e., transferring the first thermoplastic protective film 320A covered with the functional film 330 onto the first main surface 311A of the ultra-thin glass layer 310 by the hot press transfer process.

The functional film 330 is already formed on the first thermoplastic protective film 320A before the hot press transfer is performed. In some examples, the functional film 330 may be formed by a coating process.

In S22, the first substrate layer 410 on the first thermoplastic protective film 320A may be removed to expose the first thermoplastic protective film 320A, and then a side of the first thermoplastic protective film 320A facing the first substrate layer 410 is attached to the first main surface 311A of the ultra-thin glass layer 310.

In some embodiments, referring to FIG. 17, forming the functional film 330 on the surface of the first protective thermoplastic film 320A facing away from the first substrate layer 410 in S12, includes: S121, i.e., coating and curing a functional material on a surface of the first thermoplastic protective layer 321A facing away from the first carrier layer 411 to form a functional layer 331.

Referring to FIG. 17, S121 may be completed after S111.

In some examples, referring to FIG. 18, in S121, the functional layer 331 may be formed by a coating process. For example, a solution including a functional material is coated on the surface of the first thermoplastic protective layer 321A facing away from the first carrier layer 411. Then, a solvent in the solution is evaporated, so that the functional material is cured to form the functional layer 331.

In this case, referring to FIG. 18, the initial stacked structure 500 includes the first carrier layer 411, the first thermoplastic protective layer 321A and the functional layer 331.

Referring to FIG. 17, cutting the first carrier layer 411 and the first thermoplastic protective layer 321A to form the first stacked structure(s) 510 in S112, includes: S113, i.e., cutting the first carrier layer 411, the first thermoplastic protective layer 321A and the functional layer 331 to form the first stacked structure(s) 510. The first stacked structure 510 includes the first substrate layer 410, the first thermoplastic protective film 320A and the functional film 330. Referring to FIG. 18, the initial stacked structure 500 may be divided into a plurality of first stacked structures 510.

In some embodiments, the functional film 330 includes a hardened film and/or an anti-fingerprint film.

In some examples, the functional film 330 may include only the hardened film, and the hardened film may protect the first thermoplastic protective film 320A, so that the first thermoplastic protective film 320A is prevented from being scratched during use of the display device 100.

In some examples, a thickness of the hardened film is in a range of 0.1 μm to 20 μm, inclusive.

In some examples, the thickness of the hardened film is in a range of 3 μm to 20 μm, inclusive.

Based on this, in S121, a solution including a hardening material is coated on the surface of the first thermoplastic protective layer 321A facing away from the first carrier layer 411. Then, the solvent in the solution is evaporated, so that the hardening material is cured to form a hardened layer. In this case, the hardened layer is the functional layer 331.

In some examples, a material of the hardened film includes at least one of polyester resin (PET), polymethyl methacrylate (PMMA), triacetic acid, cellulose ester (TAC), polycycloolefin (COP) and polyimide (PI).

In some examples, the functional film 330 may include only the anti-fingerprint film. The anti-fingerprint film is disposed, so that fingerprints formed on the surface of the protective cover plate 300 during the use of the display device 100 may be reduced, thereby improving use experiences of a user.

In some examples, a thickness of the anti-fingerprint film is in a range of 0.1 μm to 20 μm, inclusive.

In some examples, the thickness of the anti-fingerprint film is in a range of 3 μm to 20 μm, inclusive.

In some examples, the anti-fingerprint film may be derived from multifunctional (meth)acrylate polymers with (meth)acrylic groups, multifunctional urethane (meth)acrylate oligomers with 6 to 15 (meth)acrylic groups as functional groups, multifunctional (meth)acrylate monomers with 2 to 6 (meth)acrylic groups and fluorinated (meth) acrylate monomers. The (meth)acrylic groups indicate an expression including methacrylate group(s) and/or acrylate group(s).

Based on this, in S121, a solution including an anti-fingerprint material is coated on the surface of the first thermoplastic protective layer 321A facing away from the first carrier layer 411. Then, a solvent in the solution is evaporated, so that the anti-fingerprint material is cured to form an anti-fingerprint layer. In this case, the anti-fingerprint layer is the functional layer 331.

In some examples, the functional film 330 includes the hardened film and the anti-fingerprint film. In this case, the anti-fingerprint film is disposed on a surface of the hardened film facing away from the first thermoplastic protective layer 321A, so that the functional film 330 is capable of protecting the first thermoplastic protective film 320A, and further has an anti-fingerprint function.

Based on this, referring to FIG. 19, coating and curing the functional material on the surface of the first thermoplastic protective layer 321A away from the first carrier layer 411 to form the functional layer 331 in S121, includes following S1211 and S1212.

In S1211, the hardening material is coated on the surface of the first thermoplastic protective layer 321A facing away from the first carrier layer 411, and is cured to form the hardened layer.

In S1212, the anti-fingerprint material is coated on a surface of the hardened layer facing away from the first thermoplastic protective layer 321A, and is cured to form the anti-fingerprint layer.

In some other examples, the hardened film may be doped with the anti-fingerprint material, so that the hardened film is capable of protecting the first thermoplastic protective film 320A, and further has the anti-fingerprint function.

In some embodiments, referring to FIG. 20, after the functional film 330 is formed on the surface of the first protective thermoplastic film 320A facing away from the first substrate layer 410 in S12, S13 is included, i.e., a first temporary protective film 610 is formed on a surface of the functional film 330 facing away from the first thermoplastic protective film 320A.

Referring to FIG. 21, a first stacked structure 510 formed in S13 includes the first substrate layer 410, the first thermoplastic protective film 320A, the functional film 330 and the first temporary protective film 610.

The first temporary protective film 610 may protect the functional film 330, so that before the first thermoplastic protective film 320A is transferred onto the ultra-thin glass layer 310, the functional film 330 is able to be prevented from being scratched.

In some examples, referring to FIG. 22A, forming the first temporary protective film 610 on the surface of the functional film 330 facing away from the first thermoplastic protective film 320A in S13, includes: S131, i.e., attaching a first temporary protective layer 611 to a side of the functional layer 331 facing away from the first thermoplastic protective layer 321A.

S131 may be performed after S121.

In this case, referring to FIG. 21, the initial stacked structure 500 includes the first carrier layer 411, the first thermoplastic protective layer 321A, the functional layer 331 and the first temporary protective layer 611.

Cutting the first carrier layer 411, the first thermoplastic protective layer 321A and the functional layer 331 to form the first stacked structure(s) 510 in S113, further includes: S114, i.e., cutting the first carrier layer 411, the first thermoplastic protective layer 321A, the functional layer 331 and the first temporary protective layer 611 to form the first stacked structure(s) 510. In this case, the first stacked structure 510 is formed as shown in FIG. 23, and the first stacked structure 510 includes the first substrate layer 410, the first thermoplastic protective film 320A, the functional film 330, and the first temporary protective film 610.

S114 is performed after S131.

Referring to FIGS. 20 and 22A, transferring the first thermoplastic protective film 320A covered with the functional film 330 onto the first main surface 311A of the ultra-thin glass layer 310 by the hot press transfer process in S22, includes: following S221 to S224.

In S221, the first substrate layer 410 is removed, referring to FIG. 24. In this case, a surface of the first thermoplastic protective film 320A facing away from the functional film 330 is exposed.

In some embodiments, after the first substrate layer 410 is removed in S221, S222 is included, i.e., the surface of the first thermoplastic protective film 320A facing the first substrate layer 410 is treated to introduce acidic functional groups.

In S222, the surface of the first thermoplastic protective film 320A may be treated by acid washing or plasma treatment to increase the acidic functional groups (e.g., —COOH, —C$_2$H$_2$O$_4$) on the surface of the first thermoplastic protective film 320A.

In S223, the surface of the first thermoplastic protective film 320A facing the first substrate layer 410 is attached to the first main surface 311A of the ultra-thin glass layer 310 under conditions of a set temperature and a set pressure.

S222 is before S223, i.e., before the surface of the first thermoplastic protective film 320A facing the first substrate layer 410 is attached to the first main surface 311A of the ultra-thin glass layer 310.

Referring to FIG. 25, in S223, the surface of the first thermoplastic protective film 320A facing away from the functional film 330 is attached to the first main surface 311A.

In addition, the surface of the ultra-thin glass layer 310 has abundant catenary —OH structures. In S223, under the hot press condition, the catenary —OH structures may undergo a lipid-based exchange reaction with the acidic functional groups. That is, the catenary —OH structures are bonded to the acidic functional groups, so that a bonding force between the ultra-thin glass layer 310 and the first thermoplastic protective film 320A is able to be increased, thereby increasing an adhesion effect between the ultra-thin glass layer 310 and the first thermoplastic protective film 320A.

In addition, the ultra-thin glass layer 310 also has silicon dioxide (SiO$_2$), and a dipole effect between a macromolecule lipid group in the first thermoplastic protective film 320A and a silicon dioxide layer may also increase the bonding force between the ultra-thin glass layer 310 and the first thermoplastic protective film 320A.

In S224, the first temporary protective film 610 is removed. In S224, after the first temporary protective film 610 is removed, the protective cover plate 300 as shown in FIG. 15 is formed.

In some embodiments, referring to FIG. 22A, after transferring the first thermoplastic protective film 320A covered with the functional film 330 onto the first main surface 311A of the ultra-thin glass layer 310 by the hot press transfer process in S22, S231 is included, i.e., the first thermoplastic protective film 320A and the functional film 330 are cut, so that edges of an entirety of the first thermoplastic protective film 320A and the functional film 330 are respectively flush with edges of the ultra-thin glass layer 310.

Referring to FIG. 26, the ultra-thin glass layer 310 is generally shaped, and the stacked structure formed by the first thermoplastic protective film 320A and the functional film 330 is a rectangular structure. After the first thermoplastic protective film 320A covered with the functional film 330 is transferred onto the ultra-thin glass layer 310, edges of the stacked structure are located outside a region where the ultra-thin glass layer 310 is located. The stacked structure is cut in S231, so that the edges of the stacked structure may be respectively flush with the edges of the ultra-thin glass layer 310.

In some examples, S224 may be performed before S231. In some other examples, S224 may be performed after S231, and in this case, the first temporary protective film 610 is cut while the first thermoplastic protective film 320A is cut in S231, and after the cutting, S224 is performed to remove the first temporary protective film 610.

In some other embodiments, referring to FIG. 22B, before the first thermoplastic protective film 320A covered with the functional film 330 is transferred onto the first main surface 311A of the ultra-thin glass layer 310 by the hot press transfer process in S22, S232 is included, i.e., the first thermoplastic protective film 320A and the functional film 330 are cut, so that the first thermoplastic protective film 320A, the functional film 330 and the ultra-thin glass layer 310 have a same shape and a same size.

The first thermoplastic protective film 320A and the functional film 330 are cut before the hot press transfer process, so that after the first thermoplastic protective film 320A covered with the functional film 330 is transferred onto the ultra-thin glass layer 310, the edges of the entirety of the first thermoplastic protective film 320A and the functional film 330 may be respectively flush with the edges of the ultra-thin glass layer 310.

In addition to the first thermoplastic protective film 320A, in some embodiments, referring to FIG. 27, the second main surface 311B of the ultra-thin glass layer 310 is coated with a second thermoplastic protective film 320B.

The first main surface 311A and the second main surface 311B of the ultra-thin glass layer 310 are each provided with the thermoplastic protective film 320, so that the impact resistance effect of the protection cover plate 300 may be further improved, and the ultra-thin glass layer 310 is prevented from being broken.

Based on this, in some embodiments, referring to FIGS. 28 and 29, forming the thermoplastic protective film(s) 320 each on the substrate layer 400 in S1, includes: S14, i.e., forming the second thermoplastic protective film 320B on a second substrate layer 420.

In S14, the second thermoplastic protective film 320B may be formed on the second substrate layer 420 through a coating process.

Referring to FIG. 28, in S2, transferring the thermoplastic protective film(s) 320 each onto the main surface 311 of the ultra-thin glass layer 310 by the hot press transfer process, includes: S24, i.e., transferring the second thermoplastic protective film 320B onto the second main surface 311B of the ultra-thin glass layer 310 by the hot press transfer process.

The second thermoplastic protective film 320B has adhesiveness under the hot press condition, so as to be adhered to the ultra-thin glass layer 310.

In some embodiments, referring to FIG. 30, forming the second thermoplastic protective film 320B on the second substrate layer 420 in S14, includes following S141 and S142.

In S141, a thermoplastic material is coated on a second carrier layer 421, and is cured to form a second thermoplastic protective layer 321B.

Referring to FIG. 31, the second carrier layer 421 has a large area, and the second carrier layer 421 may include a plurality of second substrate layers 420.

In S141, a solution including the thermoplastic material may be coated on the second carrier layer 421, and then dried to evaporate a solvent in the solution, so that the thermoplastic material is cured to form the second thermoplastic protective layer 321B.

The second thermoplastic protective layer 321B may include a plurality of second thermoplastic protective films 320B. Therefore, in some embodiments of the present disclosure, the plurality of second thermoplastic protective films 320B may be formed through one coating process, without separately manufacturing a second thermoplastic protective film 320B for each ultra-thin glass layer 310. Therefore, the number of coating processes may be reduced, thereby reducing the costs.

In S142, the second carrier layer 421 and the second thermoplastic protective layer 321B are cut to form second stacked structure(s) 520. The second stacked structure 520 includes the second substrate layer 420 and the second thermoplastic protective film 320B.

In S142, referring to FIG. 31, the second carrier layer 421 and the second thermoplastic protective layer 321B are cut to form the second stacked structure 520 as shown in FIG. 29.

In some embodiments, referring to FIGS. 32 and 33, after the second thermoplastic protective film 320B is formed on the second substrate layer 420 in S14, S15 is included, i.e., a second temporary protective film 620 is formed on a surface of the second thermoplastic protective film 320B facing away from the second substrate layer 420.

Referring to FIG. 33, the second stacked structure 520 formed in S15 includes the second substrate layer 420, the second thermoplastic protective film 320B and the second temporary protective film 620.

The second temporary protective film 620 may protect the second thermoplastic protective film 320B, so as to prevent the second thermoplastic protective film 320B from being scratched before the second thermoplastic protective film 320B is transferred onto the ultra-thin glass layer 310.

Figure 34A:
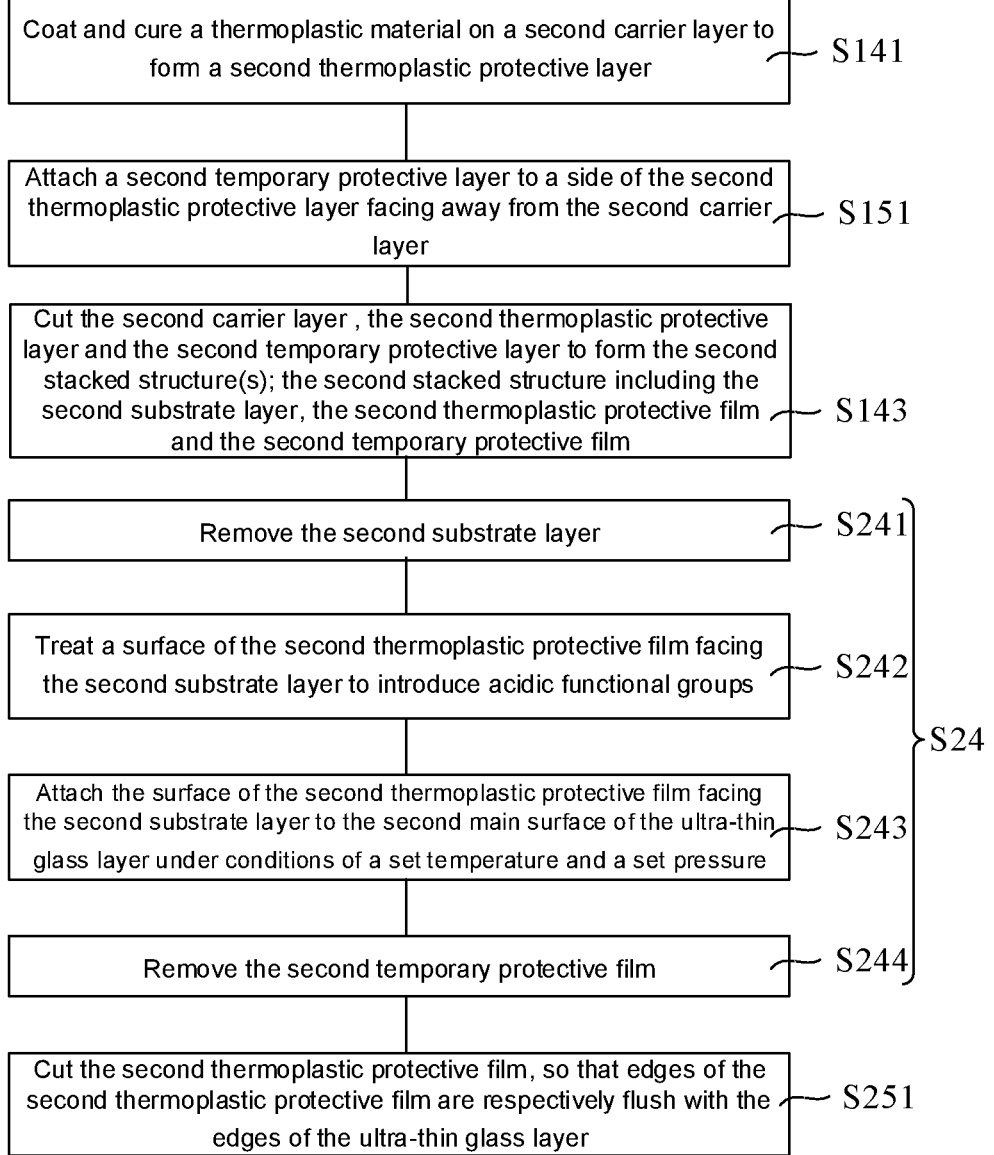
FIG. 34A is a flow diagram of a manufacturing method of a protective cover plate, in accordance with some embodiments.

In some examples, referring to FIG. 34A, in S15, forming the second temporary protective film 620 on the surface of the second thermoplastic protective film 320B facing away from the second substrate layer 420, includes: S151, i.e., attaching a second temporary protective layer 621 to a side of the second thermoplastic protective layer 321B facing away from the second carrier layer 421, referring to FIG. 35.

S151 may be performed after S141.

In S142, cutting the second carrier layer 421 and the second thermoplastic protective layer 321B to form the second stacked structure(s) 520, includes: S143, i.e., cutting the second carrier layer 421, the second thermoplastic protective layer 321B and the second temporary protective layer 621 to form the second stacked structure(s) 520. In this case, the second stacked structure 520 includes the second substrate layer 420, the second thermoplastic protective film 320B and the second temporary protective film 620.

The second stacked structure 520 formed in S142 is shown in FIG. 33.

Referring to FIG. 32, in S24, transferring the second thermoplastic protective film 320B onto the second main surface 311B of the ultra-thin glass layer 310 by the hot press transfer process, includes following S241 to S244.

In S241, the second substrate layer 420 is removed. In this case, referring to FIG. 36, a surface of the second thermoplastic protective film 320B facing away from the second temporary protective film 620 is exposed.

In some embodiments, after the second substrate layer 420 is removed in S241, S242 is included, i.e., the surface of the second thermoplastic protective film 320B facing the second substrate layer 420 is treated to introduce acidic functional groups.

The surface of the second thermoplastic protective film 320B facing the second substrate layer 420 is the surface of the second thermoplastic protective film 320B facing away from the second temporary protective film 620.

In S242, the surface of the second thermoplastic protective film 320B may be treated by acid washing or plasma treatment to increase the acidic functional groups (e.g., —COOH, —$C_2H_2O_4$) on the surface of the second thermoplastic protective film 320B.

In S243, the surface of the second thermoplastic protective film 320B facing the second substrate layer 420 is attached to the second main surface of the ultra-thin glass layer 310 under conditions of a set temperature and a set pressure.

S242 is performed before S243, i.e., before the surface of the second thermoplastic protective film 320B facing the second substrate layer 420 is attached to the second main surface of the ultra-thin glass layer 310.

Figures 36, 37:
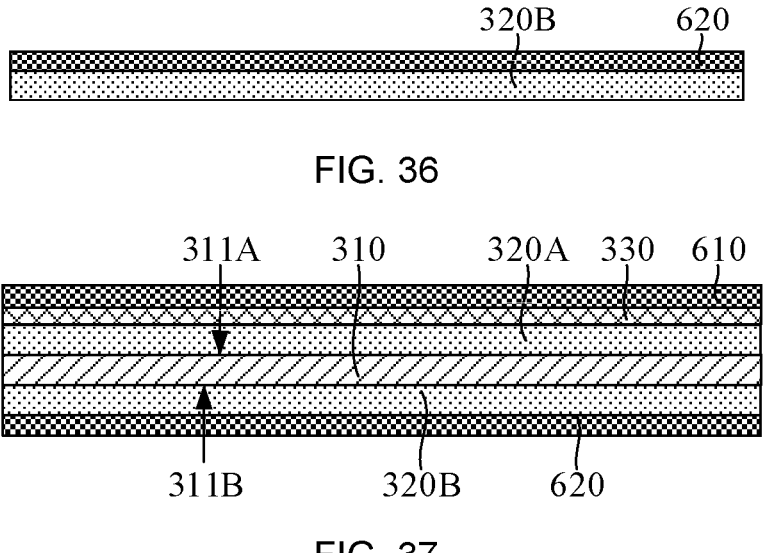
FIG. 36 is a step diagram of a manufacturing method of a protective cover plate, in accordance with some embodiments.
FIG. 37 is a step diagram of a manufacturing method of a protective cover plate, in accordance with some embodiments.

Referring to FIG. 37, the surface of the second thermoplastic protective film 320B facing away from the second temporary protective film 620 is attached to the second main surface 311B.

The surface of the ultra-thin glass layer 310 has abundant catenary —OH structures. In S243, under the hot press condition, the catenary —OH structures may undergo a lipid-based exchange reaction with the acidic functional groups. That is, the catenary —OH structures are bonded to the acidic functional groups, so that a bonding force between the ultra-thin glass layer 310 and the second thermoplastic protective film 320B is able to be increased, thereby increasing an adhesion effect between the ultra-thin glass layer 310 and the second thermoplastic protective film 320B.

In addition, the ultra-thin glass layer 310 also has silicon dioxide ($SiO_2$), and a dipole effect between a macromolecule lipid group in the second thermoplastic protective film 320B and a silicon dioxide layer may also increase the bonding force between the ultra-thin glass layer 310 and the second thermoplastic protective film 320B.

In S244, the second temporary protective film 620 is removed.

In S244, after the second temporary protective film 620 is removed, the protective cover plate 300 as shown in FIG. 27 is formed.

In some embodiments, referring to FIG. 34A, after transferring the second thermoplastic protective film 320B onto the second main surface 311B of the ultra-thin glass layer 310 by the hot press transfer process in S24, S251 is included, i.e., the second thermoplastic protective film 320B is cut, so that edges of the second thermoplastic protective film 320B are respectively flush with the edges of the ultra-thin glass layer 310.

The ultra-thin glass layer 310 is generally shaped, and the second thermoplastic protective film 320B has a rectangular structure before being transferred. After the second thermoplastic protective film 320B is transferred onto the ultra-thin glass layer 310, the edges of the second thermoplastic protective film 320B are located outside the region where the ultra-thin glass layer 310 is located. The second thermoplastic protective film 320B is cut in S251, so that the edges of the second thermoplastic protective film 320B may be respectively flush with the edges of the ultra-thin glass layer 310.

In some examples, S244 may be performed before S251. In some other examples, S244 may be performed after S251, and in this case, the second temporary protective film 620 is cut while the second thermoplastic protective film 320B is cut in S251, and after the cutting, S244 is performed to remove the second temporary protective film 620.

In some other embodiments, referring to FIG. 34B, before the second thermoplastic protective film 320B is transferred onto the second main surface 311B of the ultra-thin glass layer 310 by the hot press transfer process in S24, S252 is included, i.e., the second thermoplastic protective film 320B is cut, so that a shape and a size of the second thermoplastic protective film 320B are respectively the same as those of the ultra-thin glass layer 310.

The second thermoplastic protective film 320B is cut before the hot press transfer, so that after the second thermoplastic protective film 320B is transferred onto the ultra-thin glass layer 310, the edges of the second thermoplastic protective film 320B may be respectively flush with the edges of the ultra-thin glass layer 310.

In addition, in some examples, cutting the second thermoplastic protective film 320B in S251 and cutting the first thermoplastic protective film 320A and the functional film 330 in S231 may be performed synchronously.

In some embodiments, the first main surface 311A of the ultra-thin glass layer 310 is provided with only the first thermoplastic protective film 320A without the functional film 330, and in this case, the first thermoplastic protective film 320A and the second thermoplastic protective film 320B may be formed in one process.

Based on this, the manufacturing method of the protective cover plate includes following steps. A thermoplastic material is coated on a carrier layer, and is cured to form a thermoplastic protective layer.

A protective layer is formed on a side of the thermoplastic protective layer facing away from the carrier layer.

The carrier layer, the thermoplastic protective layer and the protective layer are cut to form a plurality of third stacked structures. The third stacked structure includes a substrate layer, a thermoplastic protective film 320 and a temporary protective film. The carrier layer may include a plurality of substrate layers, and the plurality of substrate layers include the first substrate layer 410 and the second substrate layer 420. The protective layer may include a plurality of temporary protective films, and the plurality of temporary protective films include the first temporary protective film 610 and the second temporary protective film 620. The thermoplastic protective layer may include a plurality of thermoplastic protective films, and the plurality of thermoplastic protective films include the first thermoplastic protective film 320A and the second thermoplastic protective film 320B. In this case, the plurality of third stacked structures include the first stacked structure(s) 510 and the second stacked structure(s) 520. The first stacked structure 510 includes the first substrate layer 410, the first thermoplastic protective film 320A and the first temporary protective film 610, and the second stacked structure 520 includes the second substrate layer 420, the second thermoplastic protective film 320B and the second temporary protective film 620.

The first thermoplastic protective film 320A is transferred onto the first main surface 311A of the ultra-thin glass layer 310 by the hot press transfer process. In this step, the first substrate layer 410 may be removed firstly, so that the surface of the first thermoplastic protective film 320A facing the first substrate layer 410 is exposed. Then, the surface of the first thermoplastic protective film 320A facing the first substrate layer 410 is treated to increase the acidic functional groups on the surface of the first thermoplastic protective film 320A facing the first substrate layer 410. Then, the first thermoplastic protective film 320A is transferred onto the first main surface 311A of the ultra-thin glass layer 310 at a set temperature and a set pressure. Next, the first temporary protective film 610 is removed. Finally, the first thermoplastic protective film 320A is cut, so that the edges of the first thermoplastic protective film 320A are respectively flush with the edges of the ultra-thin glass layer 310.

The second thermoplastic protective film 320B is transferred onto the second main surface 311B of the ultra-thin glass layer 310 by the hot press transfer process. In this step, the second substrate layer 420 may be removed firstly, so that the surface of the second thermoplastic protective film 320B facing the second substrate layer 420 is exposed. Then, the surface of the second thermoplastic protective film 320B facing the second substrate layer 420 is treated to increase the acidic functional groups on the surface of the second thermoplastic protective film 320B facing the second substrate layer 420. Then, the second thermoplastic protective film 320B is transferred onto the second main surface 311B of the ultra-thin glass layer 310 at a set temperature and a set pressure. Next, the second temporary protective film 620 is removed. Finally, the second thermoplastic protective film 320B is cut, so that the edges of the second thermoplastic protective film 320B are respectively flush with the edges of the ultra-thin glass layer 310.

In some examples, the first thermoplastic protective film 320A and the second thermoplastic protective film 320B may be cut synchronously.

In some embodiments, the hot press transfer process is performed at a set temperature of 40° C. to 200° C. and a set pressure of 1 MPa to 20 MPa.

Under the conditions that the temperature is 40° C. to 200° C. and the pressure is 1 Mpa to 20 Mpa, the thermoplastic protective film 320 is transferred onto the ultra-thin glass layer 310, so that the thermoplastic protective film 320 and the ultra-thin glass layer 310 may have a strong bonding force therebetween, and the protective cover plate 300 is ensured to have a good stability.

In some embodiments, referring to FIGS. 5 and 6, the thickness H1 of the thermoplastic protective film 320 is in a range of 10 μm to 500 μm, inclusive.

The thermoplastic protective film(s) 320 include the first thermoplastic protective film 320A and/or the second thermoplastic protective film 320B.

H1 is greater than or equal to 10 μm and is less than or equal to 500 μm (i.e., 10 μm≤H1≤500 μm), so that the plastic protective film 320 is prevented from being difficultly bent due to an excessive thickness H1 (e.g., greater than 500 μm) of the plastic protective film 320. In addition, the protective cover plate 300 is prevented from having a poor impact resistance due to a too small thickness H1 (e.g., less than 10 μm) of the first thermoplastic protective film 320A.

In some examples, the thickness H1 of the thermoplastic protective film 320 is in a range of 160 μm to 350 μm, inclusive.

In some embodiments, the young's modulus of elasticity of the thermoplastic protective film 320 is in a range of 5 Mpa to 10 Gpa, inclusive.

The greater the young's modulus of elasticity of the thermoplastic protective film 320, the stronger impact resistance of the thermoplastic protective film 320, and the less likely the thermoplastic protective film 320 is bent. In some embodiments of the present disclosure, the thermoplastic protective film 320 may be prevented from being difficultly bent due to an excessive modulus (e.g., greater than 10 Gpa) of the thermoplastic protective film 320. In addition, the protective cover plate 300 is prevented from having a poor impact resistance due to a too small modulus (e.g., less than 5 Mpa) of the thermoplastic protective film 320.

In some embodiments, a material of the thermoplastic protective film 320 includes at least one of polyamide, polycarbonate, polymethyl methacrylate, polyurethane, polyethylene, polyester resin and transparent polyimide; or the material of the thermoplastic protective film includes at least one of thermoplastic polyurethane, polyamide, polycarbonate, polymethyl methacrylate, polyethylene, polyester resin and transparent polyimide.

In some embodiments, referring to FIGS. 5 and 6, a thickness H3 of the ultra-thin glass layer 310 is in a range of 10 μm to 100 μm, inclusive.

H3 is greater than or equal to 10 μm and is less than or equal to 100 μm (i.e., 10 μm≤H3≤100 μm), so that the ultra-thin glass layer 310 is prevented from being difficultly bent due to an excessive thickness H3 (e.g., greater than 100 μm) of the ultra-thin glass layer 310, and the ultra-thin glass layer 310 is prevented from having a low strength due to a small thickness H3 (e.g., less than 10 μm) of the ultra-thin glass layer 310.

The display device 100 provided in some embodiments of the present disclosure includes the protective cover plate 300 in any one of the above embodiments. Therefore, the display device 100 provided in some embodiments of the present disclosure have all the beneficial effects of the protective cover plate 300 in any one of the above embodiments, which will not be repeated here.

The foregoing descriptions are merely some specific implementation manners of the present disclosure, but the protection scope of the present disclosure is not limited thereto. Changes or replacements that any person skilled in the art could conceive of within the technical scope of the present disclosure shall all be included in the protection scope of the present disclosure. Therefore, the protection scope of the present disclosure shall be subject to the protection scope of the claims.

What is claimed is:

1. A manufacturing method of a protective cover plate, comprising:
   forming a thermoplastic protective film on a substrate layer; and
   transferring the thermoplastic protective film onto a main surface of an ultra-thin glass layer by a hot press transfer process.

2. The manufacturing method of the protective cover plate according to claim 1, wherein
   forming the thermoplastic protective film on the substrate layer, includes:
      forming a first thermoplastic protective film on a first substrate layer; and
   transferring the thermoplastic protective film onto the main surface of the ultra-thin glass layer by the hot press transfer process, includes:
      transferring the first thermoplastic protective film onto a first main surface of the ultra-thin glass layer by the hot press transfer process.

3. The manufacturing method of the protective cover plate according to claim 2, wherein
   forming the first thermoplastic protective film on the first substrate layer, includes:
   coating and curing a thermoplastic material on a first carrier layer to form a first thermoplastic protective layer; and
   cutting the first carrier layer and the first thermoplastic protective layer to form a first stacked structure; the first stacked structure including the first substrate layer and the first thermoplastic protective film.

4. The manufacturing method of the protective cover plate according to claim 2, wherein
   after forming the first thermoplastic protective film on the first substrate layer, the manufacturing method further comprises:
   forming a functional film on a surface of the first thermoplastic protective film facing away from the first substrate layer; wherein
   transferring the first thermoplastic protective film onto the first main surface of the ultra-thin glass layer by the hot press transfer process, includes:
   transferring the first thermoplastic protective film covered with the functional film onto the first main surface of the ultra-thin glass layer by the hot press transfer process.

5. The manufacturing method of the protective cover plate according to claim 4, wherein forming the first thermoplastic protective film on the first substrate layer, includes:

coating and curing a thermoplastic material on a first carrier layer to form a first thermoplastic protective layer; and cutting the first carrier layer and the first thermoplastic protective layer to form a first stacked structure; the stacked structure including the first substrate layer and the first thermoplastic protective film;

forming the functional film on the surface of the first thermoplastic protective film facing away from the first substrate layer, includes:

coating and curing a functional material on a surface of the first thermoplastic protective layer facing away from the first carrier layer to form a functional layer; and cutting the first carrier layer and the first thermoplastic protective layer to form the first stacked structure, includes:

cutting the first carrier layer, the first thermoplastic protective layer and the functional layer to form the first stacked structure; the first stacked structure including the first substrate layer, the first thermoplastic protective film and the functional film.

6. The manufacturing method of the protective cover plate according to claim 4, wherein after forming the functional film on the surface of the first thermoplastic protective film facing away from the first substrate layer, the manufacturing method further comprises:

forming a first temporary protective film on a surface of the functional film facing away from the thermoplastic protective film; wherein transferring the first thermoplastic protective film covered with the functional film onto the first main surface of the ultra-thin glass layer by the hot press transfer process, includes:

removing the first substrate layer;

attaching a surface of the first thermoplastic protective film facing the first substrate layer to the first main surface of the ultra-thin glass layer under conditions of a set temperature and a set pressure; and removing the first temporary protective film; or transferring the first thermoplastic protective film covered with the functional film onto the first main surface of the ultra-thin glass layer by the hot press transfer process, includes:

removing the first substrate layer;

treating the surface of the first thermoplastic protective film facing the first substrate layer to introduce acidic functional groups;

attaching the surface of the first thermoplastic protective film facing the first substrate layer to the first main surface of the ultra-thin glass layer under the conditions of the set temperature and the set pressure; and removing the first temporary protective film.

7. The manufacturing method of the protective cover plate according to claim 6, wherein after transferring the first thermoplastic protective film covered with the functional film onto the first main surface of the ultra-thin glass layer by the hot press transfer process, the manufacturing method further comprises:

cutting the first thermoplastic protective film and the functional film, so that edges of an entirety of the first thermoplastic protective film and the functional film are respectively flush with edges of the ultra-thin glass layer; or before transferring the first thermoplastic protective film covered with the functional film onto the first main surface of the ultra-thin glass layer by the hot press transfer process, the manufacturing method further comprises:

cutting the first thermoplastic protective film and the functional film, so that the first thermoplastic protective film, the functional film and the ultra-thin glass layer have a same shape and a same size.

8. The manufacturing method of the protective cover plate according to claim 1, wherein forming the thermoplastic protective film on the substrate layer, includes:

forming a second thermoplastic protective film on a second substrate layer; and transferring the thermoplastic protective film onto the main surface of the ultra-thin glass layer by the hot press transfer process, includes:

transferring the second thermoplastic protective film onto a second main surface of the ultra-thin glass layer by the hot press transfer process.

9. The manufacturing method of the protective cover plate according to claim 8, wherein forming the second thermoplastic protective film on the second substrate layer, includes:

coating and curing a thermoplastic material on a second carrier layer to form a second thermoplastic protective layer; and cutting the second carrier layer and the second thermoplastic protective layer to form a second stacked structure; the second stacked structure including the second substrate layer and the second thermoplastic protective film.

10. The manufacturing method of the protective cover plate according to claim 8, wherein after forming the second thermoplastic protective film on the second substrate layer, the manufacturing method further comprises:

forming a second temporary protective film on a surface of the second thermoplastic protective film facing away from the second substrate layer; wherein transferring the second thermoplastic protective film onto the second main surface of the ultra-thin glass layer by the hot press transfer process, includes:

removing the second substrate layer;

attaching a surface of the second thermoplastic protective film facing the second substrate layer to the second main surface of the ultra-thin glass layer under conditions of a set temperature and a set pressure; and removing the second temporary protective film; or transferring the second thermoplastic protective film onto the second main surface of the ultra-thin glass layer by the hot press transfer process, includes:

removing the second substrate layer;

treating the surface of the second thermoplastic protective film facing the second substrate layer to introduce acidic functional groups;

attaching the surface of the second thermoplastic protective film facing the second substrate layer to the second main surface of the ultra-thin glass layer under the conditions of the set temperature and the set pressure; and removing the second temporary protective film.

11. The manufacturing method of the protective cover plate according to claim 10, wherein after transferring the second thermoplastic protective film onto the second main surface of the ultra-thin glass layer by the hot press transfer process, the manufacturing method further comprises:

cutting the second thermoplastic protective film, so that edges of the second thermoplastic protective film are respectively flush with edges of the ultra-thin glass layer; or before transferring the second thermoplastic protective film onto the second main surface of the ultra-thin glass layer by the hot press transfer process, the manufacturing method comprises:

cutting the second thermoplastic protective film, so that the second thermoplastic protective film and the ultra-thin glass layer have a same shape and a same size.

12. The manufacturing method of the protective cover plate according to claim 6, wherein the set temperature is in a range of 40° C. to 200° C., inclusive, and the set pressure is in a range of 1 Mpa to 20 Mpa, inclusive.

\* \* \* \* \*